US010409886B2

United States Patent
Ambai et al.

(10) Patent No.: US 10,409,886 B2
(45) Date of Patent: Sep. 10, 2019

(54) RELATEDNESS DETERMINATION DEVICE, NON-TRANSITORY TANGIBLE COMPUTER-READABLE MEDIUM FOR THE SAME, AND RELATEDNESS DETERMINATION METHOD

(71) Applicant: DENSO CORPORATION, Kariya, Aichi-pref. (JP)

(72) Inventors: Mitsuru Ambai, Hiratsuka (JP); Mikio Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 1011 days.

(21) Appl. No.: 14/432,592

(22) PCT Filed: Nov. 1, 2013

(86) PCT No.: PCT/JP2013/006482
§ 371 (c)(1),
(2) Date: Mar. 31, 2015

(87) PCT Pub. No.: WO2014/068990
PCT Pub. Date: May 8, 2014

(65) Prior Publication Data
US 2015/0278156 A1    Oct. 1, 2015

(30) Foreign Application Priority Data

Nov. 5, 2012 (JP) .................................. 2012-243490
Nov. 5, 2012 (JP) .................................. 2012-243491
(Continued)

(51) Int. Cl.
*G06F 17/16* (2006.01)
*G06N 20/00* (2019.01)
(Continued)

(52) U.S. Cl.
CPC ............... *G06F 17/16* (2013.01); *G06F 17/10* (2013.01); *G06K 9/6267* (2013.01); *G06N 20/00* (2019.01)

(58) Field of Classification Search
CPC ..................................................... G06F 17/16
See application file for complete search history.

(56) References Cited

U.S. PATENT DOCUMENTS 4,416,010 A * 11/1983 Hibino ............... G11B 20/1809
714/755
2007/0112699 A1 * 5/2007 Zhao .................. G06K 9/00275
706/14
(Continued)

FOREIGN PATENT DOCUMENTS

JP      S62-180488 A      8/1987
JP      H06-036034 A      2/1994
(Continued)

OTHER PUBLICATIONS

Cheng, Hong, Zicheng Liu, and Jie Yang. "Sparsity induced similarity measure for label propagation." Computer Vision, 2009 IEEE 12th International Conference on. IEEE, 2009.*
(Continued)

*Primary Examiner* — Scott A. Waldron
*Assistant Examiner* — Kevin W Figueroa
(74) *Attorney, Agent, or Firm* — Posz Law Group, PLC

(57) ABSTRACT

A relatedness determination device includes: a feature vector acquisition portion that acquires a binarized feature vector; a basis vector acquisition portion that acquires a plurality of basis vectors obtained by decomposing a real vector into a linear sum of the basis vectors, which have a plurality of elements including only binary or ternary discrete values; and a vector operation portion that sequentially performs inner product calculation between the binarized feature
(Continued)

vector and each of the basis vectors to determine relatedness between the real vector and the binarized feature vector.

25 Claims, 5 Drawing Sheets

(30) Foreign Application Priority Data

Nov. 5, 2012 (JP) ................................. 2012-243494
Oct. 11, 2013 (JP) ................................. 2013-214182

(51) Int. Cl.
*G06F 17/10* (2006.01)
*G06K 9/62* (2006.01)

(56) References Cited

U.S. PATENT DOCUMENTS

| | | | | |
|---|---|---|---|---|
| 2007/0171227 | A1* | 7/2007 | Anderson | G06T 13/00 345/473 |
| 2009/0067675 | A1* | 3/2009 | Tan | G06K 9/00798 382/104 |
| 2011/0216184 | A1* | 9/2011 | Sakagami | H04N 7/18 348/79 |
| 2012/0121161 | A1* | 5/2012 | Eade | G09B 29/007 382/153 |
| 2012/0251012 | A1* | 10/2012 | Ikai | H04N 19/44 382/232 |

FOREIGN PATENT DOCUMENTS

| | | |
|---|---|---|
| JP | H06-348832 A | 12/1994 |
| JP | 2000-322571 A | 11/2000 |
| JP | 2004-133637 A | 4/2004 |

OTHER PUBLICATIONS

Muja, Marius, and David G. Lowe. "Fast approximate nearest neighbors with automatic algorithm configuration." VISAPP (1) 2.331-340 (2009): 2.*

International Search Report and Written Opinion of the International Searching Authority dated Feb. 4, 2014 in the corresponding International application No. PCT/JP2013/006482 (and English translation).

Michel X. Goemand and David P. Williamson, "Improved Approximation Algorithms for Maximum Cut and Satisfiability Problems Using Semidefinite Programming", Journal of the ACM vol. 42, Issue 6, pp. 1115-1145, (Nov. 1995).

Ping Li, Trevor J. Hastie, and Kenneth W. Church, "Very Sparse Random Projections", KDD '06 Proceedings of the 12th ACM SIGKDD international conference on Knowledge discovery and data mining (2006).

Yair Weiss, Antonio Torralba, and Rob Fergus, "Spectral Hashing", Advances in Neural Information Processing Systems (2008).

Yuji Yamauchi, Mutsuru Ambai, Ikuro Sato, Yuichi Yoshida, and Hironobu Fujiyoshi, "Distance Computation Between Binary Code and Real Vector for Efficient Keypoint Matching", IPSJ Transactions on Computer Vision and Applications vol. 5, pp. 124-128 (Jul. 2013).

Marius Muja and David G. Lowe, "Fast Approximate Nearest Neighbors with Automatic Algorithm Configuration", in International Conference on Computer Vision Theory and Applications (VISAPP' 09), 2009.

Makoto Nakashizuka, "Binary Image Decomposition by Binary Matching Pursuits", The Transactions of the Institute of Electronics, Information Communication Engineers, vol. J85-A, No. 8, The Institute of Electronics, Information and Communication Engineers, pp. 876-886 (Aug. 1, 2002). (English abstract attached; cited in the PCT Search Report).

* cited by examiner

FIG. 2

$$
q \cong M \quad c
$$

| q | M | | | | c |
|---|---|---|---|---|---|
| 0.1 | -1 | -1 | 1 | 1 | -1.8 |
| 1.4 | 1 | 1 | -1 | -1 | 2.9 |
| -0.9 | 1 | -1 | 1 | 1 | 0.7 |
| 1.1 | 1 | 1 | 1 | -1 | 0.1 |
| 0.2 | -1 | 1 | 1 | 1 | |
| 1.9 | 1 | -1 | 1 | -1 | |

FIG. 3

| | | | | | | |
|---|---|---|---|---|---|---|
| $p$ | -1 | 1 | -1 | 1 | -1 | 1 |
| $m_i$ | -1 | 0 | 1 | 0 | 1 | 1 |
| $m_i^{bin}$ | -1 | * | 1 | * | 1 | 1 |
| $m_i^{filter}$ | 1 | -1 | 1 | -1 | 1 | 1 |
| $XOR(p, m_i^{bin})$ | -1 | * | 1 | * | 1 | -1 |
| $AND[XOR(p, m_i^{bin}), m_i^{filter}]$ | -1 | -1 | 1 | -1 | 1 | -1 |

RELATEDNESS DETERMINATION DEVICE, NON-TRANSITORY TANGIBLE COMPUTER-READABLE MEDIUM FOR THE SAME, AND RELATEDNESS DETERMINATION METHOD

CROSS REFERENCE TO RELATED APPLICATIONS

This application is a U.S. national stage of International Application No. PCT/JP2013/006482 filed on Nov. 1, 2013 and is based on Japanese Patent Application No. 2012-243490 filed on Nov. 5, 2012, No. 2012-243491 filed on Nov. 5, 2012, No. 2012-243494 filed on Nov. 5, 2012, and No. 2013-214182 filed on Oct. 11, 2013, the disclosures of which are incorporated herein by reference.

TECHNICAL FIELD

The present disclosure relates to a relatedness determination device, a relatedness determination program, and a relatedness determination method to perform arithmetic processing using feature vectors for contents such as images, speech, and characters. More specifically, the disclosure relates to a relatedness determination device, a non-transitory tangible computer-readable medium for the same, and a relatedness determination method to determine relatedness between a feature vector and a real vector using vector operation including calculation of an inner product between the real vector and the feature vector converted into a binary vector.

BACKGROUND ART

Conventionally, a feature quantity is used in many technological fields such as image retrieval, speech recognition, text retrieval, and pattern recognition. The feature quantity is generated by converting information such as an image, speech, and text so as to be easily processed on a computer. The feature quantity is represented as a D-dimensional vector (feature vector).

An operation using feature vectors can determine the degree of similarity of a content, for example. Suppose that there is a short distance between a feature vector for image α and a feature vector for image β. In this case, images α and β can be assumed to be similar to each other. Similarly, suppose that there is a short distance between a feature vector for speech waveform α and a feature vector for speech waveform β. In this case, speech waveforms α and β can be assumed to be similar to each other. The information processing such as speech recognition, text retrieval, or pattern recognition converts information into feature vectors, compares the feature vectors with each other, and finds a distance between them to determine the degree of similarity of the information.

The measurement of a distance between feature vectors uses L1 norm, L2 norm, and intervector angle as scales. The scales can be calculated as follows in terms of feature vectors $x, y \in R^D$.

L1 Norm

[Math. 1]

$$\|x-y\|_1 = \sum_i |x_i - y_i|$$

L2 Norm

[Math. 2]

$$\|x-y\|_2 = \sqrt{\sum_i (x_i - y_i)^2}$$

Intervector Angle

[Math. 3]

$$\theta = \cos^{-1}\left(\frac{x^T y}{\|x\|_2 \|y\|_2}\right)$$

The following problems arise if the feature vector equals the real vector. One problem slows down calculation of a distance between the two feature vectors $x, y \in R^D$. For example, the square of the L2 norm may be used as a distance scale as follows.

[Math. 4]

$$\|x-y\|_2^2 = \sum_{i=1}^D (x_i - y_i)^2$$

Therefore, the calculation requires subtractions D times, multiplications D times, and additions D−1 times. The calculation load is very high if the feature vector is represented in a floating-point format. Increasing the feature vector dimension further increases the calculation load.

As another problem, a large amount of memory is consumed. If a feature vector is represented in a 4-byte single-precision real number, the D-dimensional feature vector consumes 4D-bytes of memory. Increasing the feature vector dimension also increases the memory consumption. A large number of feature vectors consume the amount of memory corresponding to the feature vectors to be processed.

To solve the two problems, there are recently proposed techniques to convert a feature vector into a binary code using a sequence of 0s and 1s. Typical techniques include the random projection (see non-patent literature 1), the very sparse random projection (see non-patent literature 2), and the Spectral Hashing (see non-patent literature 3).

These techniques convert a D-dimensional feature vector into a d-bit binary code. The conversion is performed so that a distance in the original space strongly correlates with a Hamming distance in the space after the conversion (see Lemma 3.2 on page 1121 of non-patent literature 1 for the reason why a distance in the original space strongly correlates with a Hamming distance in the space after the conversion). This enables the Hamming distance calculation on binary codes to replace the calculation of a distance between feature vectors.

A Hamming distance results from counting the number of different bits in two binary codes. This calculation is very fast because it just counts the number of bits set to 1s after XORing two codes. In many cases, the binary code conversion accelerates the calculation several tens to hundreds times faster. The originally required amount of memory can be reduced from 4D bytes to d/8 bytes because the Hamming distance calculation on binary codes replaces the calculation of a distance between feature vectors. This can save the memory capacity by a tenth to a hundredth.

An extracted feature quantity can be converted into a binary code. Applying various algorithms to binary codes enables to retrieve or recognize contents. To retrieve similar contents, for example, feature quantities of contents registered to a database are all converted into binary codes in advance. The feature quantity of a content supplied as an input query is also converted into a binary code. Calculating Hamming distances between the binary code for the input query and all binary codes registered to the database can retrieve and output contents similar to the input query.

A binary code includes a sequence of 0s and 1s corresponding to d bits. The binary code may be considered a d-dimensional vector whose element each takes only two values −1 and 1. To avoid confusion in the following description, terms "binary code" and "binary vector" are distinguished as follows. A "binary code" is represented as data containing a sequence of 0s and 1s. For example, storing a 128-bit binary code in C in memory just requires an array of unsigned integer type (unsigned char) corresponding to 16 elements (8 bits×16=128 bits).

By contrast, a "binary vector" contains elements each of which takes only two values. For example, suppose that a binary vector contains elements each of which takes only −1 and 1. Then, a binary vector corresponding to binary code "01101110" is $(-1,1,1,-1,1,1,1,-1)^T$. The binary vector may contain elements each of which takes only two values 0 and 1. Further, the binary vector may contain elements each of which takes only two any values α and β(α≠β). A difference between "binary code" and "binary vector" concerns the expression of information. There is no essential difference between the two.

The feature vector can be converted into a d-dimensional binary vector whose elements each take only two values −1 and 1. Then, various processes such as recognition using SVM (support vector machine) and k-means clustering can be also applied to binary codes. However, these cases may be incapable of accepting the benefit of high-speed distance calculation based on the Hamming distance. In other words, some algorithms may disable the benefit of high-speed distance calculation based on the binary code conversion.

The following describes a classifier-based recognition process and a k-means clustering algorithm as examples that are incapable of accepting the benefit of high-speed distance calculation based on the binary code conversion. For example, the classifier-based recognition process applies the linear SVM (linear support vector machine) to a case of identifying binary vector $x \in \{-1,1\}^d$ as two classes. The linear SVM evaluates the following equation.

$$f(x) = w^T x + b$$

If f(x) is positive, the process assumes that x belongs to class A. If f(x) is negative, the process assumes that x belongs to class B.

Symbol w denotes the weight parameter and is expressed as $w \in R^d$. Symbol b denotes the bias parameter and is expressed as $b \in R^1$. A learning process automatically determines the parameters w and b using feature quantities predetermined for the learning.

In this case, $w \in R^d$ results in a real value instead of two values even if the feature quantity provided for the learning is a binary vector. The calculation of f(x) contains $w^T x$. However, the calculation of $w^T x$ requires floating-point calculation because x corresponds to two values and w corresponds to a real-value vector. The classifier-based recognition process using SVM cannot accept the benefit of high-speed calculation based on conversion of a feature vector into a binary vector.

The following describes a case of applying the k-means clustering algorithm to binary vectors, namely, a case of finding k clusters each of which groups binary vectors that are close to each other when there are provided N d-dimensional binary vectors. The k-means clustering algorithm calculates k clusters and representative vectors according to the following procedure.

Step 1: Randomly select k feature quantities from N feature quantities and define the selected feature quantities as representative vectors for a cluster.

Step 2: Find the nearest representative vector for each of the N feature quantities given as input.

Step 3: Calculate an average of the feature quantities belonging to each representative vector and define the result as a new representative vector.

Step 4: Repeat steps 2 and 3 until the results converge.

The k-means clustering algorithm causes a problem that a new representative vector is defined by an average of binary vectors at step 3. The average calculation changes the representative vector to a real-number vector even if data given as input is a binary vector. Consequently, the distance calculation at step 2 must find a distance between the binary vector and the real vector. Namely, the floating-point calculation is required. The k-means clustering algorithm also cannot accept the benefit of high-speed calculation based on conversion of a feature vector into a binary vector.

As described above, the recognition process using the classifier or the k-means clustering algorithm cannot accept the benefit of high-speed calculation based on conversion of a feature vector into a binary vector. This is because both of them require an inner product operation between d-dimensional binary vector $p \in \{-1,1\}^d$ and d-dimensional real vector $q \in R^d$. The k-means clustering algorithm requires a "distance" between d-bit binary vector $p \in \{-1,1\}^d$ and d-dimensional real vector $q \in R^d$. This ultimately results in an operation of inner product $p^T q$. This is because the square of a Euclidean distance between p and q is expressed by the following equation.

$$\|p-q\|^2 = \|p\|^2 - 2p^T q + \|q\|^2 \qquad \text{[Math. 5]}$$

The classifier-based recognition process and the k-means clustering algorithm require speeding up calculation of an inner product between a binary vector and a d-dimensional real vector to solve the problem.

PRIOR ART LITERATURES

Non-Patent Literatures

[Non-Patent Literature 1]
Michel X. Goemans, avid P. Williamson, "Improved approximation algorithms for maximum cut and satisfiability problems using semidefinite programming", Journal of the ACM Volume 42, Issue 6 (November 1995), Pages: 1115-1145

[Non-Patent Literature 2]
Ping Li, Trevor J. Hastie, Kenneth W. Church, "very sparse random projections", KDD '06 Proceedings of the 12th ACM SIGKDD international conference on Knowledge discovery and data mining (2006)

[Non-Patent Literature 3]
Y. Weiss, A. Torralba, R. Fergus., "Spectral Hashing", Advances in Neural Information Processing Systems, 2008.

SUMMARY OF INVENTION

It is an object of the present disclosure to provide a relatedness determination device, a non-transitory tangible computer-readable medium for the same, and a relatedness determination method for fast calculating inner product ($p^T q$ or $q^T p$) between a feature vector and d-dimensional real vector $q \in R^d$ when the feature vector is d-dimensional binary vector $p \in \{-1,1\}^d$.

According to a first aspect of the present disclosure, a relatedness determination device includes: a feature vector acquisition portion that acquires a binarized feature vector; a basis vector acquisition portion that acquires a plurality of basis vectors obtained by decomposing a real vector into a linear sum of the basis vectors, which have a plurality of elements including only binary or ternary discrete values; and a vector operation portion that sequentially performs inner product calculation between the binarized feature vector and each of the basis vectors to determine relatedness between the real vector and the binarized feature vector.

The above-mentioned relatedness determination device decomposes a real vector into a linear sum of binary basis vectors and performs inner product calculation between the real vector and the binarized feature vector. It is possible to speed up the inner product calculation between the feature vector and the real vector.

According to a second aspect of the present disclosure, a non-transitory tangible computer-readable medium includes instructions for execution by a computer. The instructions includes a computer-implemented method for determining relatedness between a real vector and a binarized feature vector. The instructions includes: acquiring the binarized feature vector; acquiring a plurality of basis vectors obtained by decomposing the real vector into a linear sum of a plurality of basis vectors having an element provided by only binary or ternary discrete values; and sequentially performing inner product calculation between the feature vector and each of the basis vectors to determine the relatedness between the real vector and the feature vector.

The above-mentioned non-transitory tangible computer-readable medium enables to decompose a real vector into a linear sum of binary basis vectors and perform inner product calculation between the real vector and the binarized feature vector. It is possible to speed up the inner product calculation between the feature vector and the real vector.

According to a third aspect of the present disclosure, a relatedness determination method includes: acquiring a binarized feature vector; acquiring a plurality of basis vectors obtained by decomposing a real vector into a linear sum of a plurality of basis vectors having an element provided by only binary or ternary discrete values; and sequentially performing inner product calculation between the feature vector and each of the basis vectors to determine relatedness between a real vector and the feature vector.

The above-mentioned relatedness determination method decomposes a real vector into a linear sum of binary basis vectors and performs inner product calculation between the real vector and the binarized feature vector. It is possible to speed up the inner product calculation between the feature vector and the real vector.

BRIEF DESCRIPTION OF DRAWINGS

The above and other objects, features and advantages of the present disclosure will become more apparent from the following detailed description made with reference to the accompanying drawings. In the drawings:

FIG. 2 illustrates decomposition of a real vector according to the first embodiment of the disclosure;

FIG. 3 illustrates a calculation example according to a second embodiment of the disclosure;

EMBODIMENTS FOR CARRYING OUT INVENTION

The feature quantity arithmetic unit according to embodiments of the present disclosure will be described with reference to the accompanying drawings.

First Embodiment

Figure 1:
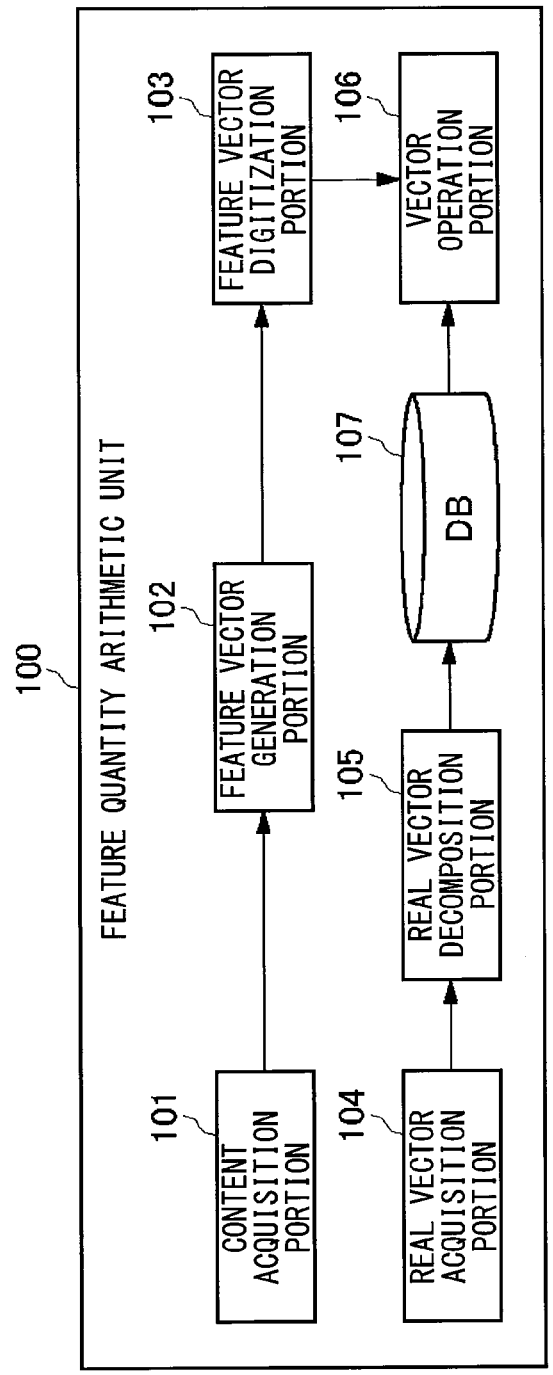
FIG. 1 is a block diagram illustrating a configuration of a feature quantity arithmetic unit according to a first embodiment of the disclosure.

FIG. 1 is a block diagram illustrating a configuration of a feature quantity arithmetic unit 100 according to an embodiment of the disclosure. The feature quantity arithmetic unit 100 includes a content acquisition portion 101, a feature vector generation portion 102, a feature vector binarization portion 103, a real vector acquisition portion 104, a real vector decomposition portion 105, a vector operation portion 106, and a database 107.

As will be described later, the feature quantity arithmetic unit 100 according to the embodiment functions as a relatedness determination device that determines relatedness between a feature vector and a real vector based on vector operation including inner product operation between a feature vector and a real vector stored as dictionary data in the database. Namely, the feature quantity arithmetic unit 100 corresponds to the relatedness determination device according to the disclosure.

The feature quantity arithmetic unit 100 as a relatedness determination device is implemented when a computer performs a relatedness determination program according to the embodiment of the disclosure. The relatedness determination program may be recorded on a recording medium and may be read from the recording medium by the computer. Alternatively, the relatedness determination program may be downloaded to the computer via a network.

The content acquisition portion 101 acquires content data such as image data, speech data, and character data. The content data may be supplied from an external device or may be generated in the content acquisition portion 101. For example, the content acquisition portion 101 may represent a camera and generate image data as content data.

The feature vector generation portion 102 generates a D-dimensional feature vector from the content data acquired by the content acquisition portion 101. When the content is an image, for example, the feature vector generation portion 102 extracts a feature quantity for the image. The feature vector binarization portion 103 binarizes the D-dimensional feature vector generated in the feature vector generation portion 102 and generates d-dimensional binary vector $p \in \{-1,1\}^d$ whose elements each takes only two values −1 and 1.

The configuration including the content acquisition portion 101, the feature vector generation portion 102, and the feature vector binarization portion 103 may finally acquire a binarized feature vector. For example, the content acquisition portion 101 and the feature vector generation portion 102 may be omitted. The feature vector binarization portion 103 may acquire a feature vector from an external device and may binarize the acquired feature vector. Alternatively, the configuration may directly acquire a binarized feature vector from an external device.

The real vector acquisition portion 104 acquires d-dimensional real vector $q \in R^d$. The real vector may be supplied from an external device, may be read from an unshown storage device for the feature quantity arithmetic unit 100, or may be generated in the real vector acquisition portion 104. The real vector includes a real number containing a float as an element.

The real vector decomposition portion 105 decomposes d-dimensional real vector $q \in R^d$ into a linear sum of binary basis vector $m_i \in \{-1,1\}^d$. Specifically, the real vector decomposition portion 105 decomposes d-dimensional real vector $q \in R^d$ into basis matrix M including binary elements and coefficient vector c including real-number elements using equation (1) as follows.

[Math. 6]

$$q \simeq Mc \quad (1)$$

In the equation, $M=(m_1, m_2, \ldots, m_k) \in \{-1, 1\}^{d \times k}$ and $c=(c_1, c_2, \ldots, c_k)^T \in R^k$. Basis matrix M includes k basis vectors $m_i$. Basis vector $m_i$ represents a d-dimensional binary vector whose element only takes −1 and 1. Accordingly, basis matrix M represents a binary matrix including d rows and k columns whose elements are set to only −1 and 1. Coefficient vector c represents a k-dimensional real vector whose element corresponds to a coefficient of a real number associated with k basis vectors. The decomposition may favorably result in a match between q and Mc but may contain an error.

(First Decomposition Technique)

The real vector decomposition portion 105 decomposes a real vector using error minimization. The first decomposition technique proceeds as follows.

(1) Randomly initialize basis matrix M and coefficient vector c.

(2) Fix basis matrix M and update coefficient vector c so as to minimize a decomposition error:

$$\|q-Mc\|_2^2 \quad \text{[Math. 7]}$$

The least-square method may be used for this purpose.

(3) Update basis matrix M while fixing coefficient vector c so as to minimize a decomposition error:

$$\|q-Mc\|_2^2 \quad \text{[Math. 8]}$$

The minimization algorithm will be described later.

(4) Repeat (2) and (3) until the results converge. For example, the convergence is determined when the following reduction amount:

$$\|q-Mc\|_2^2 \quad \text{[Math. 9]}$$

reaches a predetermined value or smaller.

(5) Retain solutions resulting from steps (1) through (4) as candidates.

(6) Repeat steps (1) through (5) and adopt a final result corresponding to basis matrix M and c as candidates that minimize the following:

$$\|q-Mc\|_2^2 \quad \text{[Math. 10]}$$

Steps (1) through (5) may not need to be repeated. However, repeating the steps several times can avoid a problem dependent on an initial value.

The following describes the process of updating basis matrix M at step (3). FIG. 2 schematizes equation (1). As enclosed with a broken line in FIG. 2, an element of the ith row vector in basis matrix M only depends on the ith element of real vector q. The binary decomposition according to the embodiment provides the ith row vector in basis matrix M only in $2^k$ forms (ternary decomposition according to a second embodiment to be described provides the ith row vector only in $3^k$ forms). The real vector decomposition portion 105 exhaustively checks all the elements and adopts a row vector that minimizes the decomposition error:

$$\|q-Mc\|_2^2 \quad \text{[Math. 11]}$$

The real vector decomposition portion 105 applies the technique to all row vectors in basis matrix M to update elements of basis matrix M.

(Second decomposition Technique)

The second decomposition technique will be described. The first decomposition technique defines the decomposition error as:

$$\|q-Mc\|_2^2 \quad \text{[Math. 12]}$$

The first decomposition technique aims at minimizing the decomposition error. However, the purpose is to approximate inner product $p^T q$ between the feature vector and the real vector after real vectors are approximated to the linear sum of basis vectors.

The second decomposition technique previously collects N feature vectors p into $P \in R^{d \times N}$. The second decomposition technique defines the decomposition error as:

$$\|P^T q - P^T Mc\|_F^2 \quad \text{[Math. 13]}$$

The second decomposition technique minimizes this decomposition error. The real vector is decomposed according to the distribution of actual data, improving accuracy in approximating an inner product.

This approximate decomposition is available by sequentially finding $m_i$. The second decomposition technique proceeds as follows.

(1) Assign q to r ($r \leftarrow q$).

(2) Assign 1 to i ($i \leftarrow 1$).

(3) Use the first decomposition technique to minimize:

$$\|r - m_i c_i\|_2^2 \quad \text{[Math. 14]}$$

and acquire $m_i$ and (4) Use $m_i$ and $c_i$ acquired at step (3) as initial values to minimize:

$$\|P^T r - m_i c_i\|_F^2 \quad \text{[Math. 15]}$$

as follows.

(4-1) Fix $m_i$ and update $c_i$ so as to minimize:

$$\|P^T r - P^T m_i c_i\|_F^2 \quad \text{[Math. 16]}$$

The least-square method may be used for this purpose.

(4-2) Fix $c_i$ and update $m_i$ so as to minimize:

$$\|P^T r - P^T m_i c_i\|_F^2 \quad \text{[Math. 17]}$$

The combinatorial optimization is applicable because $m_i$ is a discrete value. The minimization can use algorithms such as Greedy algorithm, tabu search, and simulated annealing, for example. These algorithms can also successfully minimize the decomposition error because step (3) yields good initial values.

(4-3) Repeat (4-1) and (4-2) until the results converge. For example, the convergence is determined when the following reduction amount:

$$\|P^T r - P^T m_i c_i\|_F^2 \quad \text{[Math. 18]}$$

reaches a predetermined value or smaller.

(5) Assign $r-m_i c_i$ to $r$ ($r \leftarrow r-m_i c_i$) and assign i+1 to i ($i \leftarrow i+1$). If i≥k, then return to step (3). If i>k, then proceed to step (6).

(6) Retain solutions M and c resulting from steps (1) through (6) as candidates.

(7) Repeat steps (1) through (6) and adopt a final result corresponding to basis matrix M and c as candidates that minimize the following:

$$\|P^T r - P^T m_i c_i\|_F^2 \quad \text{[Math. 19]}$$

Step (7) may not need to be repeated. However, repeating the step several times can alleviate a problem dependent on an initial value.

The first and second decomposition techniques do not necessarily require two values (or three values according to the second embodiment) for basis matrix M. The techniques are applicable if basis matrix M is supposed to include finite numbers as elements. Similarly to basis matrix M, coefficient vector c may be also a predetermined discrete value. For example, coefficient vector c may be confined to a power of 2. This can speed up processing. Suppose that an average value of elements of real vector q to be decomposed is remarkably large (or small), namely, an average value remarkably deviates from 0. In such case, the average value is subtracted from each element of real vector q to generate an offset real vector. This offset real vector is decomposed into basis matrix M and coefficient vector c. The approximate decomposition for equation (1) is available using a smaller number of bases.

The vector operation portion 106 performs operation using a feature vector. Specific contents of the operation will be described later along with application examples of the feature quantity arithmetic unit 100 according to the embodiment. The operation using the feature vector contains calculation of inner product $p^T q$ between binarized feature vector $p \in \{-1,1\}^d$ and real vector q the real vector decomposition portion 105 decomposes into a linear sum binary vectors. The calculation of inner product $p^T q$ will be described first.

Inner product $p^T q$ can be transformed into equation (2) as follows.

[Math. 20]

$$p^T q = p^T M c = (p^T M) c = \sum_{i=1}^{k} c_i (p^T m_i) \quad (2)$$

In the equation, $p^T m_i$ denotes an inner product between binary vectors. Inner product $p^T m_i$ between binary vectors can be calculated very fast. The reason follows.

An inner product between binary vectors can result in operation of a Hamming distance. The Hamming distance equals a count of the number of bits with different values in two binary codes. The Hamming distance between two binary vectors equals a count of the number of elements with different values. Suppose that the Hamming distance between p and $m_i$ is described as $D_{hamming}(p,m_i)$. Then, inner product $p^T m_i$ is related to $D_{hamming}(p,m_i)$ expressed by equation (3) as follows.

[Math. 21]

$$p^T m_i = d - 2D_{hamming}(p, m_i) \quad (3)$$

As described above, d denotes the number of bits in a binary code.

Operation of a Hamming distance is very fast because the operation applies XOR to two binary codes and then counts bits set to 1s. When a binary vector is expressed by a binary code (a bit sequence of 0s and 1s), the Hamming distance can be calculated by equation (4) as follows.

[Math. 22]

$$D_{hamming}(p, m_i) = \text{BITCOUNT}(\text{XOR}(p, m_i)) \quad (4)$$

In this equation, the XOR function XOR's between p and $m_i$ represented in binary codes. The BITCOUNT function counts the number of bits whose binary codes are set to 1s.

To sum up, inner product $p^T q$ can be transformed into equation (5) as follows.

[Math. 23]

$$p^T q = \sum_{i=1}^{k} c_i (p^T m_i) = \qquad (5)$$

$$\sum_{i=1}^{k} c_i (d - 2D_{hamming}(p, m_i)) = -2\sum_{i=1}^{k} c_i D_{hamming}(p, m_i) + d\sum_{i=1}^{k} c_i$$

The d-bit Hamming distance operation is performed k times. The operation calculates a weighted sum of k Hamming distances in relation to coefficient vector c and adds a constant term to yield $p^T q$. If k is sufficiently small, the operation can calculate $p^T q$ much faster than calculation based on the floating point precision.

In the above-mentioned inner product calculation, binarized feature vector p corresponds to a "first binary vector" and basis vector $m_i$ corresponds to a "second binary vector."

The database 107 stores dictionary data that includes a linear sum of several real vectors decomposed in the real vector decomposition portion 105, i.e., a linear sum of several basis vectors. The vector operation portion 106 reads a linear sum of basis vectors from the database 107 and performs the above-mentioned operation. The database 107 corresponds to a "basis vector acquisition portion."

The feature quantity arithmetic unit 100 according to the embodiment binarizes a feature vector and decomposes a real vector into a linear sum of binary vectors even if the arithmetic processing using a feature vector contains an inner product operation between the feature vector and other real vectors. The feature quantity arithmetic unit 100 can speed up the inner product operation on binary vectors.

Enhancement of First Embodiment

As described above, the first embodiment defines binary vector p and $m_i$ as $p \in \{-1,1\}^d$ and $m_i \in \{-1,1\}^d$, respectively. The real vector is decomposed into a linear sum of binary vectors to speed up inner product operation $p^T m_i$. However, the fast inner product operation is still available even if p and $m_i$ are defined as more general binary vector $p' \in \{-a,a\}^d$ and $m_i' \in \{-a,a\}^d$. In this case, since $p'^T m_i' = a^2(p^T m_i)$ the operation just needs to multiply $a^2$ and an inner product between binary vectors defined by −1 and 1. In this case, binary vector p results from dividing feature vector p' by coefficient a and corresponds to the "first binary vector." Binary vector $m_i$ results from dividing basis vector $m_i'$ by coefficient a and corresponds to the "second binary vector."

Furthermore, the fast inner product operation is available even if feature vector and the basis vector are defined as any binary vector $p'' \in \{\alpha, \beta\}^d$ and $m_i'' \in \{\gamma, \delta\}^d$. Coefficients $\alpha$, $\beta$, $\gamma$, and $\delta$ are real numbers and are correlated as $\alpha \neq \beta$ and $\gamma \neq \delta$. In this case, p" and $m_i''$ are acquired by linearly transforming elements of binary vector p and $m_i$ defined by $-1$ and 1 and are expanded into equations (6) and (7) as follows.

[Math. 24]

$$p'' = Ap + B\mathbf{1} \tag{6}$$

[Math. 25]

$$m_i'' = Cm_i + D\mathbf{1} \tag{7}$$

A thick letter "1" in equations (6) and (7) denotes a vector that features length d and contains elements all set to 1s. Letters A, B, C, and D in equations (6) and (7) denote real numbers and are previously calculated so as to validate equations (6) and (7).

Inner product $p''^T m_i''$ can be expanded into equation (8) as follows.

[Math. 26]

$$\begin{aligned} p'' m_i'' &= (Ap + B\mathbf{1})^T (Cm_i + D\mathbf{1}) \\ &= AC(p^T m_i) + AD(p^T \mathbf{1}) + BC(m_i^T \mathbf{1}) + BD\mathbf{1}^T \mathbf{1} \\ &= AC(p^T m_i) + AD(p^T \mathbf{1}) + BC(m_i^T \mathbf{1}) + BDd \end{aligned} \tag{8}$$

A parenthesized calculation in equation (8) denotes an inner product between binary vectors containing $-1$s and 1s. Therefore, the fast operation is available even when a feature vector is transformed into a binary vector containing elements each of which contains two unspecified values and a real vector is expanded into a linear sum of binary vectors containing elements each of which contains two unspecified values. In this case, the above-mentioned binary vector p corresponds to the "first binary vector" and yields feature vector p" by linearly transforming elements. The above-mentioned binary vector $m_i$ corresponds to the "second binary vector" and yields basis vector $m_i''$ by linearly transforming elements.

Second Embodiment

The following describes the feature quantity arithmetic unit according to the second embodiment. The feature quantity arithmetic unit according to the second embodiment is configured equally to that illustrated in FIG. 1 according to the first embodiment. The real vector decomposition portion 105 according to the first embodiment decomposes a real vector into a linear sum of binary vectors using equation (1). The real vector decomposition portion 105 of the feature quantity arithmetic unit 100 according to the second embodiment decomposes a real vector into a linear sum of ternary vectors.

The real vector decomposition portion 105 decomposes d-dimensional real vector $q \in R^d$ into a linear sum of ternary vectors. Specifically, the real vector decomposition portion 105 decomposes d-dimensional real vector $q \in R^d$ into basis matrix M containing ternary elements and coefficient vector c containing real-number elements using equation (9) below.

[Math. 27]

$$q \approx Mc \tag{9}$$

In the equation, $M = (m_1, m_2, \ldots, m_k) \in \{-1, 0, 1\}^{d \times k}$ and $c = (c_1, c_2, \ldots, c_k)^T \in R^k$. Basis matrix M contains k basis vectors $m_i$. Basis vector $m_i$ is a d-dimensional ternary vector whose elements are set to only $-1$, 0, and 1. Therefore, basis matrix M represents a ternary matrix including d rows and k columns whose elements are set to only $-1$, 0, and 1. Coefficient vector c represents a k-dimensional real vector whose element corresponds to a coefficient of a real number associated with k basis vectors. The decomposition may favorably result in a match between q and Mc but may contain an error. Similarly to the first embodiment, the real vector decomposition portion 105 decomposes a real vector based on the error minimization.

The vector operation portion 106 calculates inner product $p^T q$. In the following description, the vector operation portion 106 to calculate inner product $p^T q$ is particularly referred to as the inner product operation portion 106. Inner product $p^T q$ can be transformed into equation (10) as follows.

[Math. 28]

$$p^T q = p^T M c = (p^T M) c = \sum_{i=1}^{k} c_i (p^T m_i) \tag{10}$$

In the equation, $p^T m_i$ denotes an inner product between binary vector p and ternary vector $m_i$. The inner product operation portion 106 uses 0-permutation vector $m_i^{bin}$, filter vector $m_i^{filter}$, and number of 0 elements $z_i$ to be defined below in place of ternary vector $m_i$.

The inner product operation portion 106 replaces an element of $m_i$ with $-1$ or 1. Each element of $m_i$ may be replaced by $-1$ or 1. The replacement generates 0-permutation vector $m_i^{bin} \in \{-1, 1\}^d$. This 0-permutation vector $m_i^{bin} \in \{-1, 1\}^d$ represents a binary vector.

The inner product operation portion 106 replaces a 0-element of $m_i$ with $-1$ and replaces a non-0 element with 1. The replacement generates filter vector $m_i^{filter} \in \{-1, 1\}^d$. This filter vector $m_i^{filter} \in \{-1, 1\}^d$ also represents a binary vector.

The inner product operation portion 106 further finds the number of elements $z_i$ in $m_i$. The number of elements $z_i$ is an integer. The inner product operation portion 106 calculates $p^T m_i$ in equation (10) using binary vector $m_i^{bin}$, filter vector $m_i^{filter}$, and the number of 0 elements $z_i$ based on equations (11) and (12) below.

[Math. 29]

$$p^T m_i = d - z_i - 2 \cdot D_{filtered\_hamming}(p, m_i^{bin}, m_i^{filter}) \tag{11}$$

[Math. 30]

$$D_{filtered\_hamming}(p, m_i^{bin}, m_i^{filter}) = \text{BITCOUNT(AND} \\ (\text{XOR}(p, m_i^{bin}), m_i^{filter})) \tag{12}$$

In this equation, the AND function in equation (11) applies AND operation to binary vectors represented in binary codes.

With reference to FIG. 3, the following describes derivation of equations (11) and (12) using examples. FIG. 3 illustrates a calculation example according to the embodiment. According to the example in FIG. 3, $p = \{-1, 1, -1, 1, -1, 1\}$ and $m_i = \{-1, 0, 1, 0, 1, 1\}$. The example assumes that $m_i^{bin}=\{-1, *, 1, *, 1, 1\}$. Symbol "*" denotes −1 or 1. The example also assumes that $m_i^{filter}=\{1, -1, 1, -1, 1, 1\}$ and $z_i=2$.

In equation (11), XOR between p and $m_i^{bin}$ is expressed as XOR(p, $m_i^{bin}$)=$\{-1, *, 1, *, 1, -1\}$. Out of elements of p and $m_i$, non-0 and different elements, namely, an element as a set of −1 and 1 or a set of 1 and −1 results in −1. An element as a set of −1 and −1 or a set of 1 and 1 results in −1.

ANDing the XOR with $m_i^{filter}$ is expressed as AND(XOR (p, $m_i^{bin}$), $m_i^{filter}$)) $\{-1, -1, 1, -1, 1, -1\}$. Out of elements of p and $m_i$, non-0 different elements are set to 1 and the other elements are set to −1. The bit count results in the number of elements set to 1, namely, the number of non-0 different elements. Therefore, the result is $D_{filterd\_hamming}$ (p, $m_i^{bin}$, $m_i^{filter}$)=2.

Out of elements of p and $m_i$, the number of elements as a set of 1 and 1 or −1 and −1 is found by subtracting the number of non-0 different elements $D_{filterd\_hamming}=2$ and the number of 0-elements $z_i=2$ from the number of all elements d=6. Namely, the number of elements as a set of 1 and 1 or −1 and −1 is calculated as: $d-D_{filterd\_hamming}-z_i=6-2-2=2$ Vectors p and $m_i$ equal a value resulting from subtracting the number of elements each corresponding to a set of −1 and 1 or 1 and −1 (a set of elements whose product results in −1) from the number of elements each corresponding to a set of 1 and 1 or −1 and −1 (a set of elements whose product results in 1). This is expressed as $p^T m_i=(d-D_{filterd\_hamming}-z_i)-D_{filterd\_hamming}=d-z_i-2D_{filterd\_hamming}$ to acquire equation (12). The value is 6−2−2×2=0. Obviously, the result matches $p^T m_i=\{-1,1,-1,1,-1,1\}\times\{-1,0,1,0,1,1\}=1+0+(-1)+0+(-1)+1=0$.

According to equations (10) through (12), inner product $p^T q$ can be transformed into equation (13) below.

[Math. 31]

$$p^T q = \sum_{i=1}^{k} c_i(p^T m_i) = \sum_{i=1}^{k} c_i\left(d - z_i - 2D_{filtered\_hamming}\left(p, m_i^{bin}, m_i^{filter}\right)\right) \quad (13)$$

The inner product operation portion 106 uses equation (13) to calculate inner product $p^T q$.

Function $D_{filterd\_hamming}$(p, $m_i^{bin}$, $m_i^{filter}$) is very similar to the Hamming distance operation. A difference is only addition of the AND operation. Therefore, it is possible to calculate $p^T q$ much faster than calculation based on the floating point precision even when $q \in R^d$ is decomposed into a linear sum of ternary vectors.

As described above, the advantage to decompose d-dimensional real vector $q \in R^d$ into a linear sum of ternary vectors, not binary vectors, is that even a linear sum of fewer vectors validates the approximation of equation (9). This decreases a value for k and eventually further speeds up the processing.

Enhancement of Second Embodiment

The above-mentioned second embodiment defines binary vector p and ternary vector $m_i$ as $p \in \{-1, 1\}^d$ and $m_i \in \{-1, 0, 1\}^d$, respectively. The real vector is decomposed into a linear sum of ternary vectors to speed up inner product operation $p^T m_i$. However, the fast inner product operation is still available even if p and $m_i$ are defined as more general binary vector $p' \in \{-a, a\}^d$ and ternary vector $m_i \in \{-a, 0, a\}^d$, respectively. In this case, since $p'^T m_i' = a^2(p^T m_i)$, the operation just needs to multiply $a^2$ and an inner product between binary vectors defined by −1 and 1.

The inner product operation is available even if binary vector p and ternary vector $m_i$ are generalized as $p \in \{\alpha, \beta\}^d$ and $m_i \in \{\gamma-\delta, \gamma, \gamma+\delta\}^d$. Coefficients $\alpha$, $\beta$, $\gamma$, and $\delta$ are real numbers and are correlated as $\alpha \neq \beta$ and $\delta \neq 0$. In this case, p" and $m_i$" are acquired by applying transformation supplied as equations (14) and (15) below to elements of p and $m_i$.

[Math. 32]

$$p'' = Ap + B\mathbf{1} \quad (14)$$

[Math. 33]

$$m_i'' = Cm_i + D\mathbf{1} \quad (15)$$

A thick letter "1" in equations (14) and (15) denotes a vector that features length d and contains elements all set to 1s. Letters A, B, C, and D in equations (14) and (15) denote real numbers and are previously calculated so as to validate equations (14) and (15).

Inner product $p''^T m_i''$ can be expanded into equation (16) as follows.

[Math. 34]

$$\begin{aligned}p''^T m_i'' &= (Ap + B\mathbf{1})^T(Cm_i + D\mathbf{1}) \quad (16)\\ &= AC(p^T m_i) + AD(p^T \mathbf{1}) + BC(m_i^T \mathbf{1}) + BD\mathbf{1}^T \mathbf{1}\\ &= AC(p^T m_i) + AD(p^T \mathbf{1}) + BC(m_i^T \mathbf{1}) + BDd\end{aligned}$$

A parenthesized calculation in equation (16) denotes an inner product between binary vectors containing −1s and 1s or an inner product between a binary vector containing −1 and 1 and a ternary vector containing −1, 0, and 1. The high-speed calculation is available even when the feature vector is transformed into any binary vector and the real vector is expanded into a linear sum of generalized ternary vectors as described above.

Third Embodiment

The first and second embodiments have described the inner product operation between feature vector p and real vector q while the inner product operation is performed in the arithmetic processing in the vector operation portion 106. A later application example will describe the arithmetic processing including the inner product operation between feature vector p and real vector q. The arithmetic processing may compare inner product $p^T q$ with threshold value T. To identify a feature vector, for example, inner product $p^T q$ is compared with threshold value T.

According to the first and second embodiments, inner product $p^T q$ is expressed in equation (17) below as described with reference to equation (2) (decomposing real vector q into a linear sum of binary vectors) and equation (10) (decomposing real vector q into a linear sum of ternary vectors).

[Math. 35]

$$p^T q = \sum_{i=1}^{k} c_i(p^T m_i) \quad (17)$$

Focusing on this point, the vector operation portion 106 can speed up a threshold process by dividing (cascading) the threshold process into k stages when the operation using a feature vector includes the threshold process, namely, comparison between inner product $p^T q$ and a threshold value.

(First Cascade)

Figure 4:
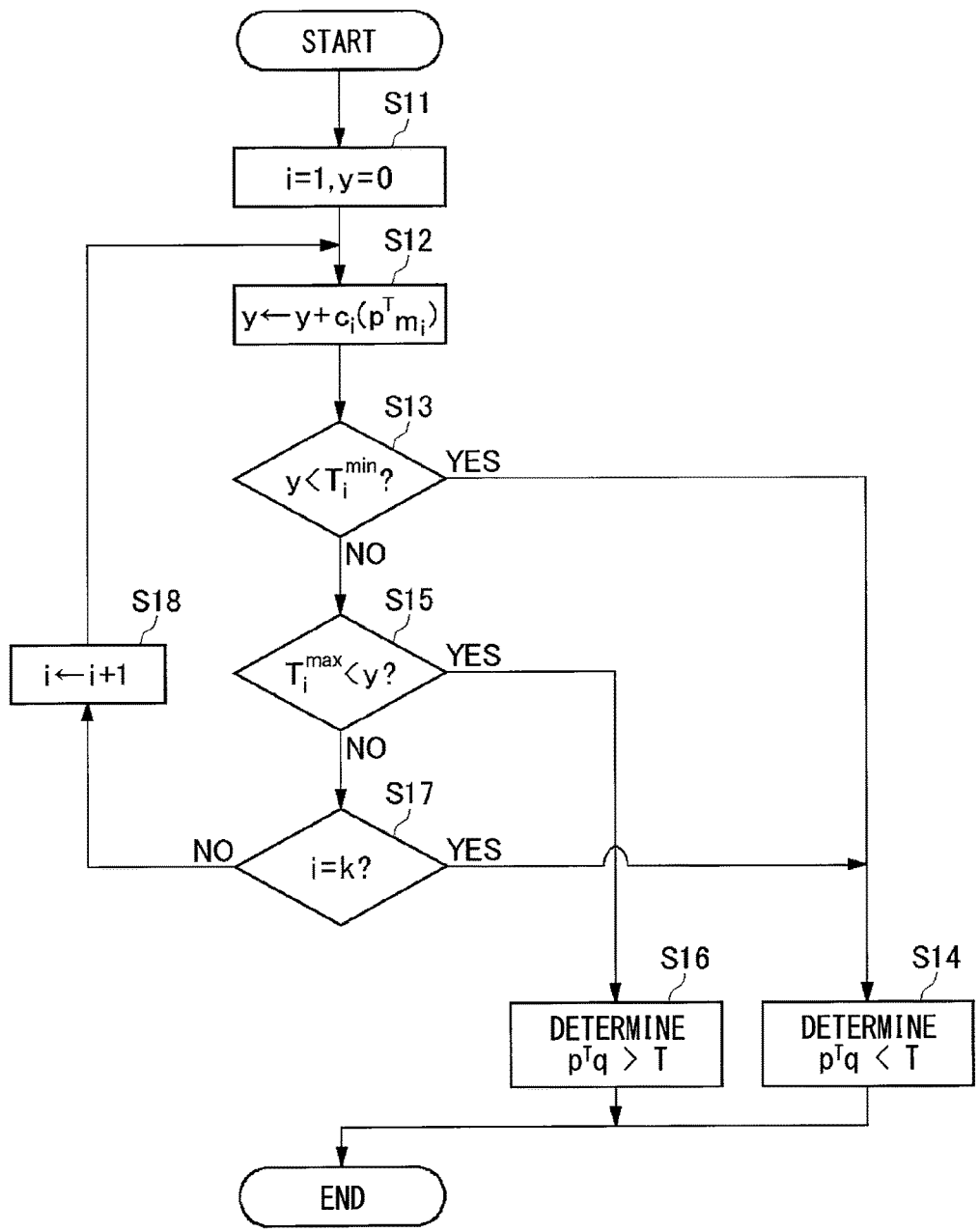
FIG. 4 is a flowchart of speeding up a threshold process according to cascading in a vector operation portion according to a third embodiment of the disclosure.

In the following description, the first cascade speeds up the threshold process. The following example uses threshold value T to determine $p^T q > T$. FIG. 4 is a flowchart of speeding up the threshold process according to cascading in the vector operation portion 106. The vector operation portion 106 sets i=1 and y=0 (step S11). The vector operation portion 106 updates y to $y + c_i(p^T m_i)$ (step S12). The vector operation portion 106 determines whether or not y is greater than $T_i^{min}$ (step S13). Term $T_i^{min}$ denotes a minimum-side early determination threshold value to early determine $p^T q < T$. The determination method will be described later. If y is smaller than $T_i^{min}$ (YES at step S13), the vector operation portion 106 determines that $p^T q < T$ (step S14). The vector operation portion 106 stops the inner product operation between feature vector p and real vector q and terminates the process.

If y is greater than or equal to $T_i^{min}$ (NO at step S13), the vector operation portion 106 determines whether or not y is greater than $T_i^{max}$ (step S15). Term $T_i^{max}$ denotes a maximum-side early determination threshold value to early determine $p^T q > T$. The determination method will be described later. If y is greater than $T_i^{max}$ (YES at step S15), the vector operation portion 106 determines that $p^T q > T$ (step S16). The vector operation portion 106 stops the inner product operation between feature vector p and real vector q and terminates the process.

If y is smaller than or equal to $T_i^{max}$ (NO at step S15), the vector operation portion 106 determines whether or not a condition of i=k is satisfied, namely, whether or not unprocessed basis $m_i$ remains (step S17). If the condition of i=k is not satisfied, (NO at step S17), the vector operation portion 106 increments i (step S18) and returns to step S12. If the condition of i=k is satisfied, all bases $m_i$ are calculated (YES at step S17). In this case, the vector operation portion 106 proceeds to step S14, determines $p^T q < T$, and terminates the process.

When calculating an inner product between binary vector p and real vector q, the threshold process can be divided into k stages by decomposing real vector q into a linear sum of binary vectors or ternary vectors. A result of the threshold process can be acquired early if $p^T q < T$ and $p^T q > T$ are evidently valid. The inner product operation between binary vector p and real vector q can be performed less often than k times.

A determination result does not completely match a case of not using the cascade (non-cascading). However, appropriately selecting $T_i^{min}$ and $T_i^{max}$ allows the determination result to infinitely match a non-cascading result.

Sorting $c_i$ based on magnitude can improve the effect of early determination. The decomposition to cause a difference between magnitudes of $c_i$ can improve the effect of early determination.

The following describes a method of determining minimum-side early determination threshold value $T_i^{min}$ and maximum-side early determination threshold value $T_i^{max}$. Consider a case of determining minimum-side early determination threshold value $T_1^{min}$ and maximum-side early determination threshold value $T_1^{max}$ at the first cascade stage. In this case, a threshold value needs to be determined for safe determination under condition that $c_i(p^T m_i)$ (i=2, 3, . . . , k) is unknown. A solution is to previously find maximum value $P_i^{max}$ and minimum value $P_i^{min}$ available to $c_i(p^T m_i)$. These values can be acquired by extracting two-value feature quantity p from several pieces of data previously supplied for learning and assigning feature quantity p to $c_i(p^T m_i)$.

Minimum-side early determination threshold value $T_i^{min}$ can be determined as follows.

$$c_1(p^T m_1) + P_2^{max} + P_2^{max} + \ldots + P_k^{max} < T \qquad \text{[Math. 36]}$$

Namely, $$c_1(p_T m_1) < T - P_2^{max} - P_3^{max} - \ldots - P_k^{max} \qquad \text{[Math. 37]}$$

If this equation is valid, $p^T q < T$ is always valid at this point because the second cascade stage or later validates $p^T q < T$ no matter how large a value is supplied. Therefore, equation (18) can find $T_i^{min}$.

[Math. 38]

$$T_1^{min} = T - P_2^{max} - P_3^{max} - \ldots - P_k^{max} \qquad (18)$$

The same technique can determine $T_i^{min}$ at the second stage or later.

Maximum-side early determination threshold value $T_i^{max}$ can be determined as follows.

$$c_1(p^T m_1) + P_2^{min} + P_3^{min} + \ldots + P_k^{min} > T \qquad \text{[Math. 39]}$$

Namely, $$c_1(p^T m_1) > T - P_2^{min} - P_3^{min} - \ldots - P_k^{min} \qquad \text{[Math. 40]}$$

If this equation is valid, $p^T q > T$ is always valid at this point because the second cascade stage or later validates $p^T q > T$ no matter how small a value is supplied. Therefore, equation (19) can find $T_i^{max}$.

[Math. 41]

$$T_1^{max} = T - P_2^{min} - P_3^{min} - \ldots - P_k^{min} \qquad (19)$$

The same technique can determine $T_i^{max}$ at the second stage or later. As is clear from the description above, $T_k^{min}$ and $T_k^{max}$ equal T.

In equation (19), $P_i^{min}$ need not be a minimum but may be selected as a value belonging to several percent of sufficiently small values in ascending order. Also in equation (18), $P_i^{max}$ need not be a maximum but may be selected as a value belonging to several percent of sufficiently large values in descending order.

(Second Cascade)

The second cascade decomposes a real vector into several sub-vectors to provide deeper cascading and thereby further speed up comparison with a threshold value. The first cascade focuses on the following:

[Math. 42]

$$p^T q = \sum_{i=1}^{k} c_i(p^T m_i)$$

and divides the threshold process into k stages. The second cascade extends the equation as follows.

As seen from equation (20) below, $q \in R^d$ is decomposed into m partial vectors.

[Math. 43]

$$q = (q_1^T, q_2^T, \ldots, q_m^T)^T \qquad (20)$$

Similarly, as seen from equation (21) below, $p \in \{1,1\}^d$ is decomposed into m partial vectors.

[Math. 44]

$$p = (p_1^T, p_2^T, \ldots, p_m^T)^T \qquad (21)$$

Assume that $q_i$ and $p_i$ use the same number of dimensions. Inner product $p^T q$ can be expressed as equation (22) below.

[Math. 45]

$$p^T q = \sum_{i=1}^{m} p_i^T q_i \qquad (22)$$

Each of m inner products $p_i^T q_i$ is comparable to an inner product between the binary vector and the real vector. The binary or ternary decomposition technique is also applicable to the inner products. If inner product $p_i^T q_i$ is decomposed into k vectors, for example, $p^T q$ can be decomposed into mk stages of cascade processing. This increases the number of cascade stages and is capable of improving the effect of early determination. The second cascade can further improve the effect of early determination by selecting a sequence of cascade processing so as to consider the order of absolute values of coefficients or decrease incorrect identification.

The above-mentioned third embodiment determines whether or not $p^T q < T$ is evidently valid (i.e., $p^T q > T$ is evidently invalid) and $p^T q > T$ is evidently valid in order to determine $p^T q > T$. However, only one of these determinations may be selected.

The following describes arithmetic processing in the vector operation portion 106. The vector operation portion 106 according to the first and second embodiments includes an inner product calculation between binarized feature vector p and real vector q. There are variations of such arithmetic processing. The above-mentioned embodiments of the disclosure are applicable to various apparatuses that perform arithmetic processing using feature vectors. As described above, the third embodiment is particularly applicable to various apparatuses that perform arithmetic processing including comparison between a feature vector and a threshold value. The following describes application examples of the disclosure as fourth through sixth embodiments.

Fourth Embodiment

Figure 5:
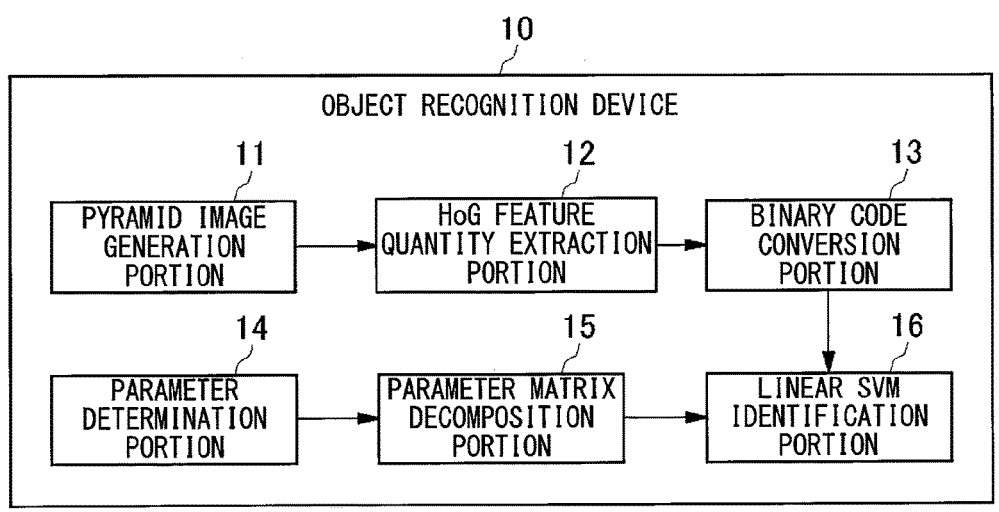
FIG. 5 is a block diagram illustrating a configuration of an object recognition device according to a fourth embodiment of the disclosure.

The embodiment applies the present disclosure to object recognition based on HoG. FIG. 5 is a block diagram illustrating a configuration of an object recognition device. An object recognition device 10 performs object recognition based on HoG. The object recognition device 10 includes a pyramid image generation portion 11, an HoG feature quantity extraction portion 12, a binary code conversion portion 13, a parameter determination portion 14, a parameter matrix decomposition portion 15, a linear SVM identification portion 16, and a peak detection portion 17

The pyramid image generation portion 11 acquires an image as an input query and generates a pyramid image by reducing the image at several stages of magnifications. The pyramid image generation portion 11 can generate differently sized objects. The pyramid image generation portion 11 corresponds to the content acquisition portion 101 illustrated in FIG. 1. The HoG feature quantity extraction portion 12 divides a pyramid image at each stage into cells each sized into 8×8 pixels and extracts an HoG feature quantity from each cell. The HoG feature quantity extraction portion 12 extracts a D-dimensional feature quantity from each cell. The HoG feature quantity extraction portion 12 corresponds to the feature vector generation portion 102 illustrated in FIG. 1. The binary code conversion portion 13 converts the D-dimensional supplied to each cell into a d-dimensional binary vector. The binary code conversion portion 13 corresponds to the feature vector binarization portion 103 illustrated in FIG. 1.

The parameter determination portion 14 determines weight vector w and bias b of a real number used for a linear SVM in the linear SVM identification portion 16. The parameter determination portion 14 performs a learning process to determine weight vector w and bias b using a feature quantity provided for learning. The parameter matrix decomposition portion 15 decomposes weight vector w into a linear sum of discrete value vectors using equation (1) or (9) described in the first or second embodiment.

The linear SVM identification portion 16 identifies a feature vector using the linear SVM. The linear SVM identification portion 16 configures a detection window based on a group of W×H cells. A W×H×d-dimensional feature vector is extracted from one detection window. The linear SVM identification portion 16 applies the linear SVM according to equation (20) below to the feature vector.

[Math. 46]

$$f(x) = w^T x + b \qquad (23)$$

The fast inner product operation between a real vector and a binary vector described in the first or second embodiment can implement inner product operation $w^T x$ in the linear SVM.

Detection results may be fixed near a detection position. To solve this problem, the peak detection portion 17 assumes a representative detection position that corresponds to a maximum in surrounding f(x) values. The linear SVM identification portion 16 and the peak detection portion 17 perform processes using feature vectors and correspond to the vector operation portion 106 in FIG. 1. As described in the third embodiment, the technique of speeding up the threshold process using the cascade can be applied to operations in the linear SVM identification portion 16 and the peak detection portion 17.

Fifth Embodiment

Figure 6:
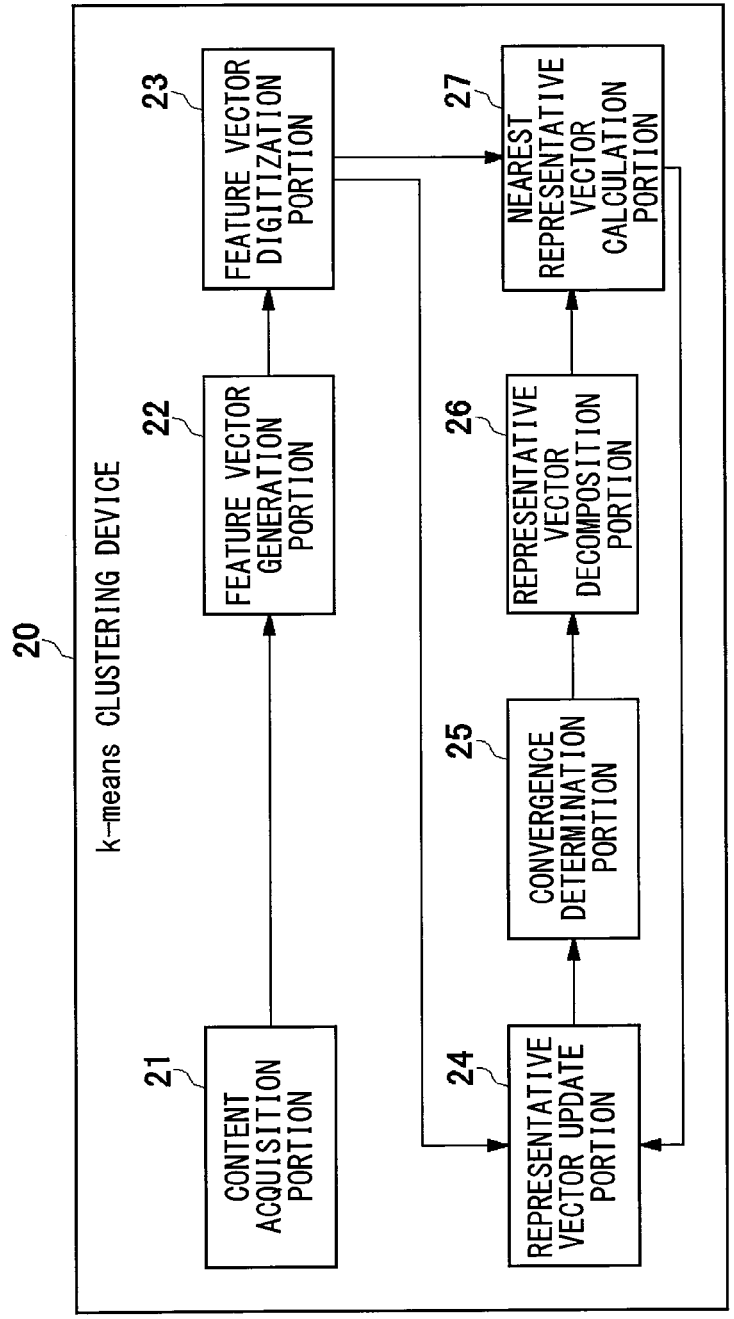
FIG. 6 is a block diagram illustrating a configuration of a k-means clustering device according to a fifth embodiment of the disclosure.

The fifth embodiment applies the present disclosure to the k-means clustering algorithm. FIG. 6 is a block diagram illustrating a configuration of a k-means clustering device. The k-means clustering device 20 includes a content acquisition portion 21, a feature vector generation portion 22, a feature vector binarization portion 23, a representative vector update portion 24, a convergence determination portion 25, a representative vector decomposition portion 26, and a nearest representative vector search portion 27.

The content acquisition portion 21 acquires N contents to be clustered. When the content acquisition portion 21 acquires a content, the feature vector generation portion 22 extracts a feature quantity as a feature vector for the content from the content. The feature vector binarization portion 23 binarizes each feature vector extracted by the feature vector extraction portion 22.

The representative vector update portion 24 randomly selects k feature vectors from N feature vectors binarized by the feature vector binarization portion 23 and assumes the selected feature vectors to be representative vectors. The convergence determination portion 25 determines convergence each time the representative vector update portion 24 updates the representative vector. When the convergence determination portion 25 determines the convergence, the k-means clustering device 20 terminates the clustering process. The representative vector decomposition portion 26 decomposes the representative vector updated by the representative vector update portion 24 into vectors of discrete value (binary or ternary).

The nearest representative vector search portion 27 is supplied with N binary vectors from the feature vector binarization portion 23 and associates each binary vector with the nearest representative vector. The nearest representative vector 27 outputs the result to the representative vector update portion 24. The representative vector update portion 24 calculates an average vector for (binarized) feature vectors associated with each representative vector and defines the average vector as a new representative vector. The representative vector updated in the representative vector update portion 24 is calculated from an average of binary vectors and is therefore available as a real vector.

If the representative vector decomposition portion 26 is unavailable, the nearest representative vector search portion 27 needs to calculate an inner product between the updated representative vector (real vector) and the feature vector (binary vector) to find a distance between these vectors. As described above, the embodiment allows the representative vector decomposition portion 26 to decompose the representative vector (real vector) into vectors of discrete value (binary or ternary) as described in the first or second embodiment. This enables the nearest representative vector search portion 27 to speed up calculation of a distance between each feature vector and representative vector and fast search for a representative vector (i.e., a representative vector to be associated) nearest to each feature vector.

Sixth Embodiment

The embodiment applies the present disclosure to approximate nearest neighbor searches using a k-means tree. An approximate nearest neighbor search device according to the embodiment uses the approximate nearest neighbor search technique based on a k-ary tree using k-means. The technique is proposed in: Marius Muja and David G. Lowe, "Fast Approximate Nearest Neighbors with Automatic Algorithm Configuration", in International Conference on Computer Vision Theory and Applications (VISAPP '09), 2009 (http://www.cs.ubc.ca/~mariusm/index.php/FLANN/ FLANN, http://people.cs.ubc.ca/~mariusm/uploads/ FLANN/flann_visapp09.pdf).

Specifically, the approximate nearest neighbor search device according to the embodiment recursively applies the k-means to N pieces of data to configure a k-ary tree and approximately searches for a nearest point based on the tree search principle proposed above. This technique is designed on the assumption that data is a real vector and a representative vector registered to a node is a binary vector. However, the first or second embodiment can speed up the tree search even when data is a binary vector and a representative vector registered to a node is a real vector.

(Modifications)

In the feature quantity arithmetic unit 100, some of and the other of the content acquisition portion 101, the feature vector generation portion 102, the feature vector binarization portion 103, the real vector acquisition portion 104, the real vector decomposition portion 105, and the vector operation portion 106 may be configured as different devices. In particular, the content acquisition portion 101, the feature vector generation portion 102, the feature vector binarization portion 103, and the vector operation portion 106 may be included in the feature arithmetic unit 100. The real vector acquisition portion 104 and the real vector decomposition portion 105 may be included in another device. In this case, the database in the feature arithmetic unit 100 stores several real vectors (a set of coefficient vectors and basis vectors) decomposed by the real vector decomposition portion 105. The vector operation portion 106 acquires several decomposed real vectors from the database. The vector operation portion 106 functions as a basis vector acquisition portion (first and second embodiments), a binary vector acquisition portion (first embodiment), or a ternary vector acquisition portion (second embodiment).

Content data acquired by the content acquisition portion 101 may correspond to measurement data acquired from a vehicle. Further, measurement data acquired from the vehicle may correspond to image data captured by a camera provided for the vehicle or sensing data measured by a sensor provided for the vehicle, for example. In this case, the vector operation portion 106 in the feature arithmetic unit 100 as a relatedness determination device determines relatedness between the measurement data and dictionary data. For example, the database stores data of several portrait images as the dictionary data when image data captured by the camera provided for the vehicle is acquired. The vector operation portion 106 in the feature arithmetic unit 100 as a relatedness determination device may determine whether or not an image corresponding to the image data contains a person according to any of the fourth through sixth embodiments.

(Notes)

The above-mentioned first through sixth embodiments include the following technologies (not limited thereto).

(Note 1-1)

A feature quantity arithmetic unit including:

a feature vector acquisition portion to acquire a binarized feature vector;

a real vector acquisition portion to acquire a real vector;

a real vector decomposition portion to decompose the real vector into a linear sum of binary basis vectors; and a vector operation portion to perform operation including an inner product calculation between the feature vector and the decomposed real vector.

This configuration decomposes a real vector into a linear sum of binary basis vectors and performs inner product calculation between the real vector and the binarized feature vector. It is possible to speed up the inner product calculation between the feature vector and the real vector.

(Note 1-2)

The feature quantity arithmetic unit according to Note 1-1. The inner product calculation between the feature vector and the decomposed real vector includes inner product calculation between a first binary vector containing only −1 and 1 as elements and several second binary vectors containing only −1 and 1 as elements.

This configuration allows the first and second binary vectors to contain only −1 and 1 as elements. The calculation of a Hamming distance can replace the calculation of an inner product between the binary vectors and can speed up an inner product calculation between the feature vector and the real vector.

(Note 1-3)

The feature quantity arithmetic unit according to Note 1-2. The first binary vector corresponds to the feature vector.

According to this configuration, a binarized feature vector contains only −1 and 1 as elements. It is possible to speed up the inner product calculation between the feature vector and the real vector.

(Note 1-4)

The feature quantity arithmetic unit according to Note 1-2. The first binary vector corresponds to a vector resulting from dividing each element of the feature vector by a specified coefficient.

This configuration allows a binarized feature vector to correspond to a binary vector expressed as $p' \in \{-a,a\}^d$ using any coefficient a.

(Note 1-5)

The feature quantity arithmetic unit according to Note 1-2. Linearly transforming each element of the first binary vector provides the feature vector. Linearly transforming each element of the first binary vector provides the feature vector.

This configuration allows a binarized feature vector to correspond to a binary vector expressed as $p'' \in \{\alpha, \beta\}^d$ ($\alpha \neq \beta$) using any coefficients $\alpha$ and $\beta$.

(Note 1-6)

The feature quantity arithmetic unit according to any one of Notes 1-2 through 1-5. The second binary vector corresponds to the basis vector.

This configuration allows a binary basis vector to include only −1 and 1 as elements, making it possible to speed up inner product calculation between a feature vector and a real vector.

(Note 1-7)

The feature quantity arithmetic unit according to any one of Notes 1-2 through 1-5. The second binary vector corresponds to a vector resulting from dividing each element of the basis vector by a specified coefficient.

This configuration allows a binary basis vector to correspond to a binary vector expressed as $m_i' \in \{-a,a\}^d$ using any coefficient a.

(Note 1-8)

The feature quantity arithmetic unit according to any one of Notes 1-2 through 1-5. Linearly transforming each element of the second binary vector provides the basis vector.

This configuration allows a binary basis vector to correspond to a binary vector expressed as $m_i'' \in \{\gamma, \delta\}^d$ ($\gamma \neq \delta$) using any coefficients $\gamma$ and $\delta$.

(Note 1-9)

The feature quantity arithmetic unit according to any one of Notes 1-2 through 1-8. The vector operation portion performs XOR between the first binary vector and the second binary vector to calculate an inner product between the first binary vector and the second binary vector.

This configuration provides a less loaded calculation of XOR between the first binary vector and the second binary vector to be able to speed up inner product calculation between a feature vector and a real vector.

(Note 1-10)

The feature quantity arithmetic unit according to any one of Notes 1-2 through 1-9. A first update fixes elements of the basis vectors and updates several coefficients related to the basis vectors so as to minimize a decomposition error. A second update fixes the coefficients and updates elements of the basis vectors so as to minimize a decomposition error. The real vector decomposition portion repeats the first update and the second update to find the basis vectors and the coefficients.

This configuration can appropriately decompose a real vector into a linear sum of binary basis vectors. In particular, the basis vector, since it is binary, provides a finite number of candidates for combinations of the elements and enables to fast perform the first update.

(Note 1-11)

The feature quantity arithmetic unit according to Note 1-10. The real vector decomposition portion repeats the first update and the second update until a reduction amount of the decomposition error reaches a specified value or smaller.

This configuration can maintain a decomposition error within a specified range.

(Note 1-12)

The feature quantity arithmetic unit according to Note 1-10 or 1-11. The real vector decomposition portion changes initial values for the basis vectors and the coefficients to find several ways of the basis vectors and the coefficients and accepts the basis vectors and the coefficients that minimize the decomposition error.

This configuration can decrease variations due to the initial values and further reduce a decomposition error.

(Note 1-13)

The feature quantity arithmetic unit according to any one of Notes 1-1 through 1-12. The real vector decomposition portion uses discrete values for several coefficients related to the basis vectors.

This configuration only uses a discrete value for a coefficient in decomposition of a real vector into a linear sum of basis vectors and therefore can speed up the second update.

(Note 1-14)

The feature quantity arithmetic unit according to any one of Notes 1-1 through 1-13. The real vector decomposition portion subtracts an average value of elements of the real vector from each element of the real vector to generate an offset real vector and decomposes the offset real vector into a linear sum of the basis vectors.

This configuration shifts real vector elements near 0 and therefore can speed up decomposition into a linear sum of basis vectors.

(Note 1-15)

The feature quantity arithmetic unit according to any one of Notes 1-1 through 1-14.

The feature vector corresponds to an HoG feature quantity.

The real vector corresponds to a weight vector for a linear SVM.

The vector operation portion identifies the feature vector using a linear SVM.

This configuration can speed up inner product calculation between a weight vector and a feature vector in the linear SVM.

(Note 1-16)

The feature quantity arithmetic unit according to any one of Notes 1-1 through 1-14.

The feature vector is applicable to a k-means clustering algorithm.

The real vector corresponds to a representative vector in the k-means clustering algorithm.

The vector operation portion performs a clustering process including operation on a distance between the feature vector and the representative vector.

This configuration can speed up operation in the k-means clustering algorithm, namely, operation on a distance between the feature vector and the representative vector.

(Note 1-17)

The feature quantity arithmetic unit according to any one of Notes 1-1 through 1-14.

The feature vector is applicable to an approximate nearest neighbor search based on a k-means tree.

The real vector corresponds to a representative vector registered to a node of a k-ary tree.

The vector operation portion performs a clustering process including operation on a distance between the feature vector and the representative vector.

This configuration can speed up operation on a distance between a feature vector in the approximate nearest neighbor search based on the k-means tree and a representative vector registered to a node of the k-ary tree.

(Note 1-18)

The feature quantity arithmetic unit according to any one of Notes 1-15 through 1-17. The feature vector represents a feature quantity of an image.

This configuration can speed up inner product calculation between a feature vector and real vector in the operation on the image feature quantity.

(Note 1-19)

A feature quantity operation program that allows a computer to function as the feature quantity arithmetic unit according to any one of Notes 1-1 through 1-18.

This configuration also decomposes a real vector into a linear sum of binary basis vectors and performs inner product calculation between the real vector and the binarized feature vector. It is possible to speed up the inner product calculation between the feature vector and the real vector.

(Note 1-20)

A feature quantity operation method including:

a feature vector acquisition step to acquire a binarized feature vector;

a real vector acquisition step to acquire a real vector;

a real vector decomposition step to decompose the real vector into a linear sum of binary basis vectors; and a feature vector calculation step to perform an operation including inner product calculation between the feature vector and the decomposed real vector.

This configuration also decomposes a real vector into a linear sum of binary basis vectors and performs inner product calculation between the real vector and the binarized feature vector. It is possible to speed up the inner product calculation between the feature vector and the real vector.

(Note 2-1)

A feature quantity arithmetic unit including:

a feature vector acquisition portion to acquire a binarized feature vector;

a real vector acquisition portion to acquire a real vector;

a real vector decomposition portion to decompose the real vector into a linear sum of ternary basis vectors; and a vector operation portion to perform operation including an inner product calculation between the feature vector and the decomposed real vector.

This configuration decomposes a real vector into a linear sum of ternary basis vectors and performs inner product calculation between the real vector and the binarized feature vector. It is possible to speed up the inner product calculation between the feature vector and the real vector.

(Note 2-2)

The feature quantity arithmetic unit according to Note 2-1. Inner product calculation between the feature vector and the decomposed real vector includes inner product calculation between a binary vector containing only −1 and 1 as elements and several ternary vectors containing only −1, 0, and 1 as elements.

This configuration allows a binary vector to contain only −1 and 1 as elements and allows a ternary vector to contain only −1, 0, and 1 as elements. The calculation of a Hamming distance can replace the calculation of an inner product between the binary vectors and can speed up an inner product calculation between the feature vector and the real vector.

(Note 2-3)

The feature quantity arithmetic unit according to Note 2-2. The binary vector corresponds to the feature vector.

According to this configuration, a binarized feature vector contains only −1 and 1 as elements. It is possible to speed up the inner product calculation between the feature vector and the real vector.

(Note 2-4)

The feature quantity arithmetic unit according to Note 2-2. The binary vector corresponds to a vector resulting from dividing each element of the feature vector by a specified coefficient.

This configuration allows a binarized feature vector to correspond to a binary vector expressed as $p' \in \{a,a\}^d$ using any coefficient a.

(Note 2-5)

The feature quantity arithmetic unit according to Note 2-2. Linearly transforming each element of the binary vector provides the feature vector.

This configuration allows a binarized feature vector to correspond to a binary vector expressed as $p'' \in \{\alpha,\beta\}^d$ ($a \neq \beta$) using any coefficients $\alpha$ and $\beta$.

(Note 2-6)

The feature quantity arithmetic unit according to any one of Notes 2-2 through 2-5. The ternary vectors correspond to the basis vectors.

According to this configuration, a ternary basis vector contains only −1, 0, and 1 as elements. It is possible to speed up the inner product calculation between the feature vector and the real vector.

(Note 2-7)

The feature quantity arithmetic unit according to any one of Notes 2-2 through 2-5. The ternary vectors correspond to vectors resulting from dividing each element of the basis vectors by a specified coefficient.

This configuration allows a ternary basis vector to correspond to a ternary vector expressed as $m_i' \in \{-a,0,a\}^d$ using any coefficient a.

(Note 2-8)

The feature quantity arithmetic unit according to any one of Notes 2-2 through 2-5. The ternary vectors linearly transform elements of the ternary vectors to acquire the basis vectors.

This configuration allows a ternary basis vector to correspond to a ternary vector expressed as $m_i'' \in \{\gamma-\delta,\gamma,\gamma+\delta\}^d$ ($\gamma \neq \delta$) using any coefficients $\gamma$ and $\delta$.

(Note 2-9)

The feature quantity arithmetic unit according to any one of Notes 2-2 through 2-8. In inner product calculation between the binary vector and the ternary vector, the vector operation portion replaces a 0 element of the ternary vector with any one of −1 and 1 to generate a 0-permutation vector. The vector operation portion replaces a 0 element of the ternary vector with −1 and a non-0 element with 1 to generate a filter vector. The vector operation portion performs AND between the filter vector and XOR between the binary vector and the 0-permutation vector to find Dfilter-d_hamming, namely, the number of non-0 different elements between the binary vector and the ternary vector. The vector operation portion subtracts the number of elements Dfilter-d_hamming and the number of non-0 elements from the number of elements of the binary vector to find the number of non-0 same elements between the binary vector and the ternary vector. The vector operation portion subtracts the number of non-0 different elements between the binary vector and the ternary vector from the number of non-0 same elements between the binary vector and the ternary vector to find an inner product between the binary vector and the ternary vector.

This configuration uses a 0-permutation vector and a filter vector and allows the calculation of a Hamming distance to replace inner product operation between a binary vector and a ternary vector. It is possible to speed up the inner product calculation between the feature vector and the real vector.

(Note 2-10)

The feature quantity arithmetic unit according to any one of Notes 2-1 through 2-9. A first update fixes elements of the basis vectors and updates several coefficients related to the basis vectors so as to minimize a decomposition error. A second update fixes the coefficients and updates elements of the basis vectors so as to minimize a decomposition error. The real vector decomposition portion repeats the first update and the second update to find the basis vectors and the coefficients.

This configuration can appropriately decompose a real vector into a linear sum of ternary basis vectors. In particular, the basis vector, since it is ternary, provides a finite number of candidates for combinations of the elements and enables to fast perform the first update.

(Note 2-11)

The feature quantity arithmetic unit according to Note 2-10. The real vector decomposition portion repeats the first update and the second update until a reduction amount of the decomposition error reaches a specified value or smaller.

This configuration can maintain a decomposition error within a specified range.

(Note 2-12)

The feature quantity arithmetic unit according to Note 2-10 or 2-11. The real vector decomposition portion changes initial values for the basis vectors and the coefficients to find several ways of the basis vectors and the coefficients and accepts the basis vectors and the coefficients that minimize the decomposition error.

This configuration can decrease variations due to the initial values and further reduce a decomposition error.

(Note 2-13)

The feature quantity arithmetic unit according to any one of Notes 2-1 through 2-12. The real vector decomposition portion uses discrete values for several coefficients related to the basis vectors.

This configuration only uses a discrete value for a coefficient in decomposition of a real vector into a linear sum of basis vectors and therefore can speed up the second update.

(Note 2-14)

The feature quantity arithmetic unit according to any one of Notes 2-1 through 2-13. The real vector decomposition portion subtracts an average value of elements of the real vector from each element of the real vector to generate an offset real vector and decomposes the offset real vector into a linear sum of the basis vectors.

This configuration shifts real vector elements near 0 and therefore can speed up decomposition into a linear sum of basis vectors.

(Note 2-15)

The feature quantity arithmetic unit according to any one of Notes 2-1 through 2-14.

The feature vector corresponds to an HoG feature quantity.

The real vector corresponds to a weight vector for a linear SVM.

The vector operation portion identifies the feature vector using a linear SVM.

This configuration can speed up inner product calculation between a weight vector and a feature vector in the linear SVM.

(Note 2-16)

The feature quantity arithmetic unit according to any one of Notes 2-1 through 2-14.

The feature vector is applicable to a k-means clustering algorithm.

The real vector corresponds to a representative vector in the k-means clustering algorithm.

The vector operation portion performs a clustering process including operation on a distance between the feature vector and the representative vector.

This configuration can speed up operation in the k-means clustering algorithm, namely, operation on a distance between the feature vector and the representative vector.

(Note 2-17)

The feature quantity arithmetic unit according to any one of Notes 2-1 through 2-14.

The feature vector is applicable to an approximate nearest neighbor search based on a k-means tree.

The real vector corresponds to a representative vector registered to a node of a k-ary tree.

The vector operation portion performs a clustering process including operation on a distance between the feature vector and the representative vector.

This configuration can speed up operation on a distance between a feature vector in the approximate nearest neighbor search based on the k-means tree and a representative vector registered to a node of the k-ary tree.

(Note 2-18)

The feature quantity arithmetic unit according to any one of Notes 2-15 through 2-17. The feature vector represents a feature quantity of an image.

This configuration can speed up inner product calculation between a feature vector and real vector in the operation on the image feature quantity.

(Note 2-19)

A feature quantity operation program that allows a computer to function as the feature quantity arithmetic unit according to any one of Notes 2-1 through 2-18.

This configuration also decomposes a real vector into a linear sum of ternary basis vectors and performs inner product calculation between the real vector and the binarized feature vector. It is possible to speed up the inner product calculation between the feature vector and the real vector.

(Note 2-20)

A feature quantity operation method including:

a feature vector acquisition step to acquire a binarized feature vector;

a real vector acquisition step to acquire a real vector;

a real vector decomposition step to decompose the real vector into a linear sum of ternary basis vectors; and a feature vector calculation step to perform an operation including inner product calculation between the feature vector and the decomposed real vector.

This configuration also decomposes a real vector into a linear sum of ternary basis vectors and performs inner product calculation between the real vector and the binarized feature vector. It is possible to speed up the inner product calculation between the feature vector and the real vector.

(Note 3-1)

A feature quantity arithmetic unit including:

a feature vector acquisition portion to acquire a binarized feature vector;

a real vector acquisition portion to acquire a real vector;

a real vector decomposition portion to decompose the real vector into a linear sum of basis vectors containing discrete-value elements; and a vector operation portion to perform operation that compares a specified threshold value with an inner product between the feature vector and the decomposed real vector.

The vector operation portion determines whether or not an inner product between the feature vector and the decomposed real vector is greater than the threshold value and/or whether or not the inner product is smaller than the threshold value each time inner product calculation is performed between the feature vector and each of the basis vectors.

This configuration decomposes a real vector into a linear sum of basis vectors containing discrete-value elements. An inner product calculation between the feature vector and the decomposed real vector can be divided into stages corresponding to the number of basis vectors. Accordingly, the threshold process can be performed at each of the stages. This enables to early determine whether an inner product between the feature vector and the decomposed real vector is larger or smaller than a threshold value before the calculation at all the stages is completed.

(Note 3-2)

The feature quantity arithmetic unit according to Note 3-1. The vector operation portion determines whether or not an inner product between the feature vector and the decomposed real vector is greater than the threshold value each time inner product calculation is performed between the feature vector and each of the basis vectors depending on whether or not the sum of inner products up to a current basis vector is greater than a maximum-side early determination threshold value.

This configuration compares the sum of hitherto calculated inner products with a maximum-side early determination threshold value at the stage each time inner product calculation is performed between a feature vector and each of the basis vectors. It is possible to determine whether or not an inner product between the feature vector and the decomposed real vector is greater than a threshold value.

(Note 3-3)

The feature quantity arithmetic unit according to Note 3-2. The vector operation portion performs learning to find a minimum value applicable to an inner product between the feature vector and each of the basis vectors. The vector operation portion subtracts the sum of minimum values for values applicable to an inner product between the feature vector and the basis vector excluded from the inner product calculation from the threshold value to find the maximum-side early determination threshold value.

This configuration enables to determine that the final inner product between a feature vector and a decomposed real vector is not smaller than a threshold value even when the sum of inner products between the feature vector and the basis vector excluded from the inner product calculation is minimal. This enables to determine that the inner product between the feature vector and the decomposed real vector is greater than the threshold value.

(Note 3-4)

The feature quantity arithmetic unit according to Note 3-3. A minimum value applicable to an inner product between the feature vector and each of the basis vectors belongs to several percent of values applicable to an inner product between the feature vector and each of the basis vectors in ascending order of the values from the smallest side.

This configuration can speed up determination of a minimum value applicable to an inner product between the feature vector and the basis vector according to learning.

(Note 3-5)

The feature quantity arithmetic unit according to any one of Notes 3-1 through 3-4. The vector operation portion determines whether or not an inner product between the feature vector and the decomposed real vector is smaller than the threshold value each time inner product calculation is performed between the feature vector and each of the basis vectors depending on whether or not the sum of inner products up to a current basis vector is smaller than a minimum-side early determination threshold value.

This configuration compares the sum of hitherto calculated inner products with a minimum-side early determination threshold value at the stage each time inner product calculation is performed between a feature vector and each of the basis vectors. It is possible to determine whether or not an inner product between the feature vector and the decomposed real vector is smaller than a threshold value.

(Note 3-6)

The feature quantity arithmetic unit according to Note 3-5. The vector operation portion performs learning to find a maximum value applicable to an inner product between the feature vector and each of the basis vectors. The vector operation portion subtracts the sum of maximum values for values applicable to an inner product between the feature vector and the basis vector excluded from the inner product calculation from the threshold value to find the minimum-side early determination threshold value.

This configuration enables to determine that the final inner product between a feature vector and a decomposed real vector is not greater than a threshold value even when the sum of inner products between the feature vector and the basis vector excluded from the inner product calculation is maximal. This enables to determine that the inner product between the feature vector and the decomposed real vector is smaller than the threshold value.

(Note 3-7)

The feature quantity arithmetic unit according to Note 3-6. A maximum value applicable to an inner product between the feature vector and each of the basis vectors belongs to several percent of values applicable to an inner product between the feature vector and each of the basis vectors in descending order of the values from a largest side.

This configuration can speed up determination of a maximum value applicable to an inner product between the feature vector and the basis vector according to learning.

(Note 3-8)

The feature quantity arithmetic unit according to any one of Notes 3-1 through 3-7. The real vector decomposition portion provides coefficients for basis vectors in descending order of absolute values.

This configuration enables to early determine whether or not an inner product between a feature vector and a decomposed real vector is greater than a threshold value and/or determine whether or not the inner product is smaller than a threshold value.

(Note 3-9)

The feature quantity arithmetic unit according to any one of Notes 3-1 through 3-8.

The feature vector corresponds to an HoG feature quantity.

The real vector corresponds to a weight vector for a linear SVM.

The vector operation portion identifies the feature vector using a linear SVM each time inner product calculation is performed between the feature vector and each of the basis vectors.

This configuration enables the linear SVM to early identify a feature vector before calculations at all stages are completed.

(Note 3-10)

A feature quantity operation program that allows a computer to function as the feature quantity arithmetic unit according to any one of Notes 3-1 through 3-9.

This configuration also decomposes a real vector into a linear sum of basis vectors containing discrete-value elements. An inner product calculation between the feature vector and the decomposed real vector can be divided into stages corresponding to the number of basis vectors. Accordingly, the threshold process can be performed at each of the stages. This enables to early determine whether an inner product between the feature vector and the decomposed real vector is larger or smaller than a threshold value before the calculation at all the stages is completed.

(Note 3-11)

A feature quantity operation method including:

a feature vector acquisition step to acquire a binarized feature vector;

a real vector acquisition step to acquire a real vector;

a real vector decomposition step to decompose the real vector into a linear sum of ternary basis vectors containing discrete-value elements; and a feature vector calculation step to perform an operation to compare a specified threshold value with an inner product between the feature vector and the decomposed real vector.

The feature vector calculation step determines whether or not an inner product between the feature vector and the decomposed real vector is greater than the threshold value and/or whether or not the inner product is smaller than the threshold value each time inner product calculation is performed between the feature vector and each of the basis vectors.

This configuration also decomposes a real vector into a linear sum of basis vectors containing discrete-value elements. An inner product calculation between the feature vector and the decomposed real vector can be divided into stages corresponding to the number of basis vectors. Accordingly, the threshold process can be performed at each of the stages. This enables to early determine whether an inner product between the feature vector and the decomposed real vector is larger or smaller than a threshold value before the calculation at all the stages is completed.

(Note 4-1)

A feature quantity arithmetic unit including:

a feature vector acquisition portion to acquire a binarized feature vector;

a binary vector acquisition portion to acquire several binary vectors containing elements each configured as only a binary discrete value; and a vector operation portion to sequentially perform inner product calculation between the feature vector and each of the binary vectors.

The vector operation portion performs XOR between the feature vector and the binary vector to calculate an inner product between the feature vector and the binary vector.

This configuration provides a less loaded calculation of XOR between the binarized feature vector and the binary vector to be able to speed up inner product calculation between the binarized feature vector and the binary vector.

(Note 4-2)

A feature quantity arithmetic unit including:

a feature vector acquisition portion to acquire a binarized feature vector;

a ternary vector acquisition portion to acquire several ternary vectors containing elements each configured as only three values −1, 0, and 1; and a vector operation portion to sequentially perform inner product calculation between the feature vector and each of the ternary vectors.

In inner product calculation between the feature vector and the ternary vector, the vector operation portion replaces a 0 element of the ternary vector with any one of −1 and 1 to generate a 0-permutation vector. The vector operation portion replaces a 0 element of the ternary vector with −1 and a non-0 element with 1 to generate a filter vector. The vector operation portion performs AND between the filter vector and XOR between the feature vector and the 0-permutation vector to find Dfilterd_hamming, namely, the number of non-0 different elements between the feature vector and the ternary vector. The vector operation portion subtracts the number of elements Dfilterd_hamming and the number of non-0 elements from the number of elements of the feature vector to find the number of non-0 same elements between the feature vector and the ternary vector. The vector operation portion subtracts the number of non-0 different elements between the feature vector and the ternary vector from the number of non-0 same elements between the feature vector and the ternary vector to find an inner product between the feature vector and the ternary vector.

This configuration uses a 0-permutation vector and a filter vector and allows the calculation of a Hamming distance to replace inner product operation between a binarized feature vector and a ternary vector. It is possible to speed up the inner product calculation between the binarized feature vector and the ternary vector.

The present disclosure provides an effect of speeding up the inner product calculation between the feature vector and the real vector and is useful as a feature quantity arithmetic unit to perform arithmetic processing using feature vectors for contents such as images, speech, and characters.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A relatedness determination device comprising a computer, including a processor, a memory, and a storage, wherein:

one or both of the processor and the memory functions as
a feature vector acquisition portion that acquires a binarized feature vector representative of binary code input data, the binary code input data including measurement data acquired by a vehicle in which the relatedness determination device is disposed;

a database, stored in one or both of the memory and storage, functions as a basis vector acquisition portion that acquires a plurality of basis vectors obtained by decomposing a real vector, representative of binary code reference data stored as dictionary data, into a linear sum of the basis vectors, the basis vectors having a plurality of elements including only binary or ternary discrete values;

one or both of the processor and the memory further functions as a vector operation portion that determines relatedness between the measurement data and the dictionary data by sequentially performing an inner product calculation between the binarized feature vector and each of the basis vectors;

the inner product calculation between the binarized feature vector and each of the basis vectors includes an inner product calculation between a binary vector having only −1 and 1 as an element and a plurality of ternary vectors having only −1, 0, and 1 as an element; and in the inner product calculation between the binary vector and the plurality of ternary vectors, the vector operation portion:

replaces an element of 0 in the ternary vector with any one of −1 and 1 to generate a zero-permutation vector, replaces an element of 0 in the ternary vector with −1, and replaces an element other than 0 with 1 to generate a filter vector, performs a conjunction operation between the filter vector and an exclusive-or operation, which is performed between the binary vector and the zero-permutation vector, to obtain the number of different elements other than 0 between the binary vector and the ternary vector, subtracts the number of different elements and the number of elements other than 0 from the number of elements of the binary vector to obtain the number of same elements other than 0 between the binary vector and the ternary vector, and subtracts the number of different elements other than 0 between the binary vector and the ternary vector from the number of same elements other than 0 between the binary vector and the ternary vector to obtain an inner product between the binary vector and the ternary vector.

2. The relatedness determination device according to claim 1, wherein the basis vectors are obtained so as to minimize a decomposition error, which is a difference between the real vector and a linear sum of the basis vectors.

3. The relatedness determination device according to claim 2, wherein the plurality of basis vectors together with a plurality of coefficients are obtained by repeatedly performing a first update and a second update, the first update fixing each element of the basis vectors and updating the plurality of coefficients related to the basis vectors so as to minimize the decomposition error, and the second update fixing the plurality of coefficients and updating each element of the basis vectors so as to minimize the decomposition error.

4. The relatedness determination device according to claim 3, wherein the basis vectors are obtained by repeating the first update and the second update until a reduction amount of the decomposition error is equal to or smaller than a predetermined value.

5. The relatedness determination device according to claim 2, wherein the basis vectors are obtained by changing initial values of the basis vectors and the coefficients to obtain a plurality of combinations of the basis vectors and the coefficients, and selecting one of combinations of the basis vectors and the coefficients that minimizes the decomposition error.

6. The relatedness determination device according to claim 2, wherein a plurality of coefficients related to the basis vectors are discrete values.

7. The relatedness determination device according to claim 2, wherein the basis vectors are obtained by subtracting an average value of elements of the real vector from each element of the real vector to generate an offset real vector, and decomposing the offset real vector into a linear sum of the basis vectors.

8. The relatedness determination device according to claim 1, wherein the basis vectors are obtained so as to minimize a decomposition error being a difference between an inner product, which is performed between the real vector and the feature vector, and an inner product, which is performed between a linear sum of the basis vectors and the feature vector.

9. The relatedness determination device according to claim 1, wherein the measurement data includes an image data captured by a camera provided in the vehicle.

10. The relatedness determination device according to claim 9, wherein the dictionary data includes data of a plurality of portrait images, and wherein determining relatedness between the measurement data and the dictionary data includes determining whether the image data includes a person in the dictionary data.

11. A relatedness determination device comprising a computer, including at least a processor, a memory, and a storage, wherein:

one or both of the processor and the memory functions as a feature vector acquisition portion that acquires a binarized feature vector representative of binary code input data, the binary code input data including measurement data acquired by a vehicle in which the relatedness determination device is disposed;

a database, stored in one or both of the memory and the storage, functions as a basis vector acquisition portion that acquires a plurality of basis vectors obtained by decomposing a real vector, representative of binary code reference data stored as dictionary data, into a linear sum of the basis vectors, the basis vectors having a plurality of elements including only binary or ternary discrete values;

one or both of the processor and the memory further functions as a vector operation portion that determines relatedness between the measurement data and the dictionary data by sequentially performing an inner product calculation between the binarized feature vector and each of the basis vectors;

the vector operation portion obtains a sum of results of the inner product calculation each time the inner product calculation is performed between the binarized feature vector and each of the basis vectors, and obtains an available range of the integration values when the real vector is related to the feature vector; and when the sum of results exceeds the available range, the vector operation portion cancels the inner product calculation, and determines a magnitude relationship between a predetermined threshold value and an inner product, which is performed between the binarized feature vector and the plurality of basis vectors.

12. The relatedness determination device according to claim 11,
wherein the vector operation portion cancels the inner product calculation, and determines that an inner product between the real vector and the feature vector is greater than the threshold value when a sum of results of the inner product calculation up to a current basis vector is greater than a maximum-side early determination threshold value each time inner product calculation is performed between the feature vector and each of the basis vectors.

13. The relatedness determination device according to claim 12,
wherein the vector operation portion obtains the maximum-side early determination threshold value by obtaining a minimum value applicable to an inner product between the feature vector and each of the basis vectors according to a learning, and subtracting a sum of minimum values applicable to an inner product between the feature vector and the basis vector, of which the inner product calculation is not performed at that time, from the threshold value.

14. The relatedness determination device according to claim 13,
wherein a minimum value applicable to an inner product between the feature vector and each of the basis vectors is a value at a predetermined ranking of values applicable to an inner product between the feature vector and each of the basis vectors in an ascending order of the values from a smallest side.

15. The relatedness determination device according to claim 12,
wherein a minimum-side early determination threshold value corresponds to a minimum sum of available results of the inner product calculation when the real vector is related to the feature vector.

16. The relatedness determination device according to claim 15,
wherein the vector operation portion determines that the feature vector is not related to the plurality of basis vectors when determining that an inner product between the real vector and the feature vector is greater than the minimum-side early determination threshold value.

17. The relatedness determination device according to claim 11,
wherein the vector operation portion cancels the inner product calculation, and determines that an inner product between the real vector and the feature vector is smaller than the threshold value when a sum of results of the inner product calculation up to a current basis vector is smaller than a minimum-side early determination threshold value each time inner product calculation is performed between the feature vector and each of the basis vectors.

18. The relatedness determination device according to claim 17,
wherein the vector operation portion obtains the minimum-side early determination threshold value by obtaining a maximum value applicable to an inner product between the feature vector and each of the basis vectors according to a learning, and subtracting a sum of maximum values applicable to an inner product between the feature vector and the basis vector, of which the inner product calculation is not performed at that time, from the threshold value.

19. The relatedness determination device according to claim 18,
wherein a maximum value applicable to an inner product between the feature vector and each of the basis vectors is a value at a predetermined ranking of values applicable to an inner product between the feature vector and each of the basis vectors in a descending order of the values from a largest side.

20. The relatedness determination device according to claim 17,
wherein the minimum-side early determination threshold value corresponds to a minimum sum of available results of the inner product calculation when the real vector is related to the feature vector.

21. The relatedness determination device according to claim 20,
wherein the vector operation portion determines that the feature vector is not related to the plurality of basis vectors when determining that an inner product between the real vector and the feature vector is smaller than the minimum-side early determination threshold value.

22. The relatedness determination device according to claim 11,
wherein the vector operation portion performs the inner product calculation in order from a basis vector having a large absolute value of a coefficient.

23. A relatedness determination device comprising a computer, including a processor, a memory, and a storage, wherein:
one or both of the processor and the memory functions as a feature vector acquisition portion that acquires a binarized feature vector representative of binary code input data, the binary code input data including measurement data acquired by a vehicle in which the relatedness determination device is disposed;
a database, stored in one or both of the memory and storage, functions as a basis vector acquisition portion that acquires a plurality of basis vectors obtained by decomposing a real vector, representative of binary code reference data stored as dictionary data, into a linear sum of the basis vectors, the basis vectors having a plurality of elements including only binary or ternary discrete values;
one or both of the processor and the memory further functions as a vector operation portion that determines relatedness between the measurement data and the dictionary data by sequentially performing an inner product calculation between the binarized feature vector and each of the basis vectors; and
the vector operation portion decomposes the binarized feature vector and the decomposed real vector into a plurality of partial vectors, respectively, and determines whether an inner product between a decomposed vector for the feature vector and a partial vector for the decomposed real vector is larger than or smaller than a threshold value.

24. A non-transitory tangible computer-readable medium including instructions for execution by a computer, including a processor, a memory, and a storage, the instructions including:
acquiring, by one or both of the processor and the memory, a binarized feature vector representative of binary code input data, the binary code input data including measurement data acquired by a vehicle in which the computer is disposed;

acquiring, by one or both of the memory and the storage, functioning as a database, a plurality of basis vectors obtained by decomposing a real vector, representative of binary code reference data stored as dictionary data, into a linear sum of a plurality of basis vectors having an element provided by only binary or ternary discrete values;

determining relatedness between the measurement data and the dictionary data by sequentially performing, by one or both of the processor and the memory, an inner product calculation between the feature vector and each of the basis vectors;

obtaining, by one or both of the processor and the memory, a sum of results of the inner product calculation each time the inner product calculation is performed between the binarized feature vector and each of the basis vectors, and obtaining an available range of the integration values when the real vector is related to the feature vector; and when the sum of results exceeds the available range, canceling, by one or both of the processor and the memory, the inner product calculation, and determining a magnitude relationship between a predetermined threshold value and an inner product, which is performed between the binarized feature vector and the plurality of basis vectors.

25. A relatedness determination method, implemented in a computer, including a processor, a memory, and a storage, the method comprising:

acquiring, by one or both of the processor and the memory, a binarized feature vector representative of binary code input data, the binary code input data including measurement data acquired by a vehicle in which the computer is disposed;

acquiring, by one or both of memory and the storage, functioning as a database, a plurality of basis vectors obtained by decomposing a real vector, representative of binary code reference data stored as dictionary data, into a linear sum of a plurality of basis vectors having an element provided by only binary or ternary discrete values;

determining relatedness between the measurement data and the dictionary data by sequentially performing, by one or both of the processor and the memory, an inner product calculation between the binarized feature vector and each of the basis vectors;

obtaining, by one or both of the processor and the memory, a sum of results of the inner product calculation each time the inner product calculation is performed between the feature vector and each of the basis vectors, and obtaining an available range of the integration values when the real vector is related to the feature vector; and when the sum of results exceeds the available range, canceling, by one or both of the processor and the memory, the inner product calculation, and determining a magnitude relationship between a predetermined threshold value and an inner product, which is performed between the binarized feature vector and the plurality of basis vectors.

* * * * *